United States Patent Office 3,788,865
Patented Jan. 29, 1974

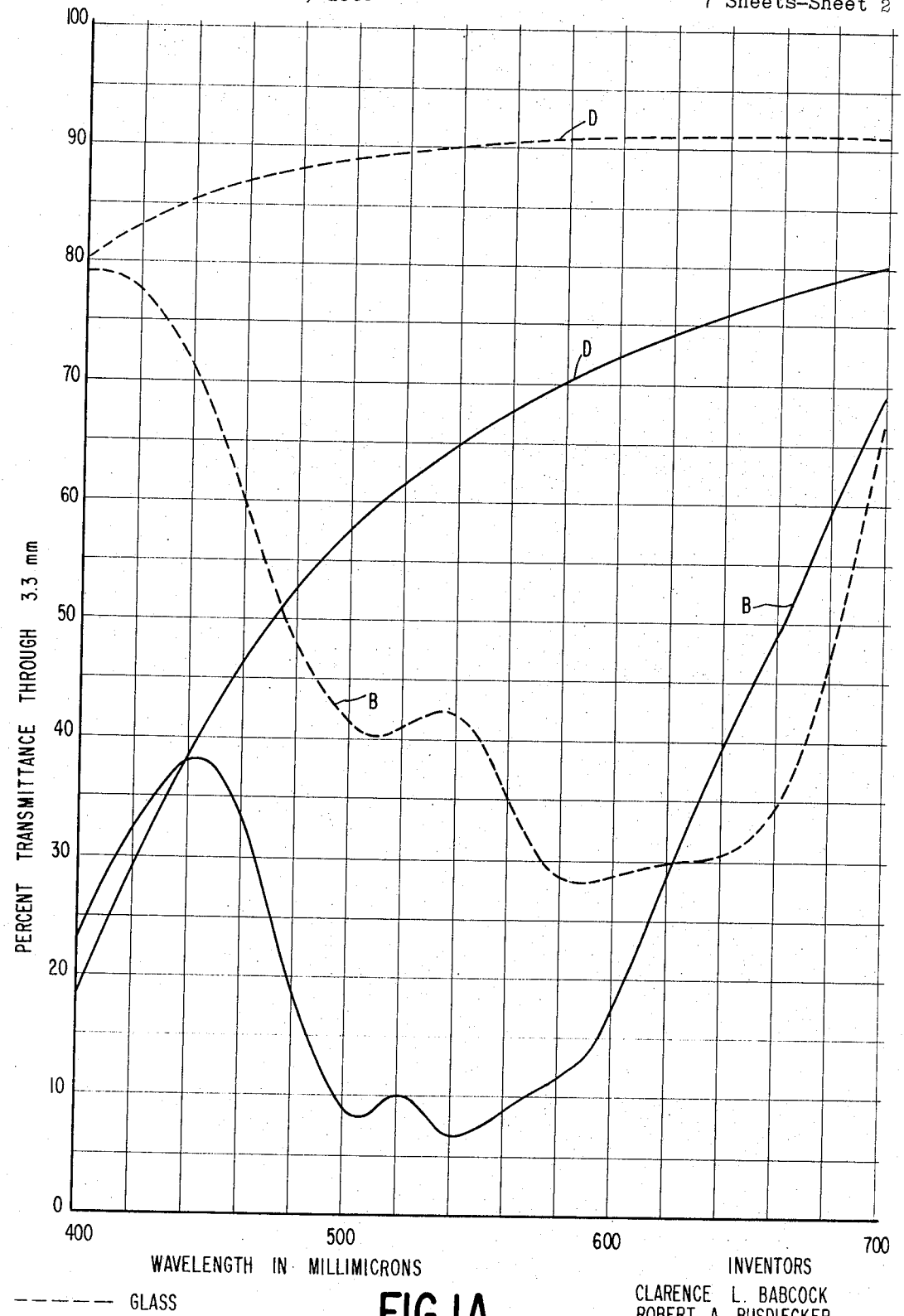

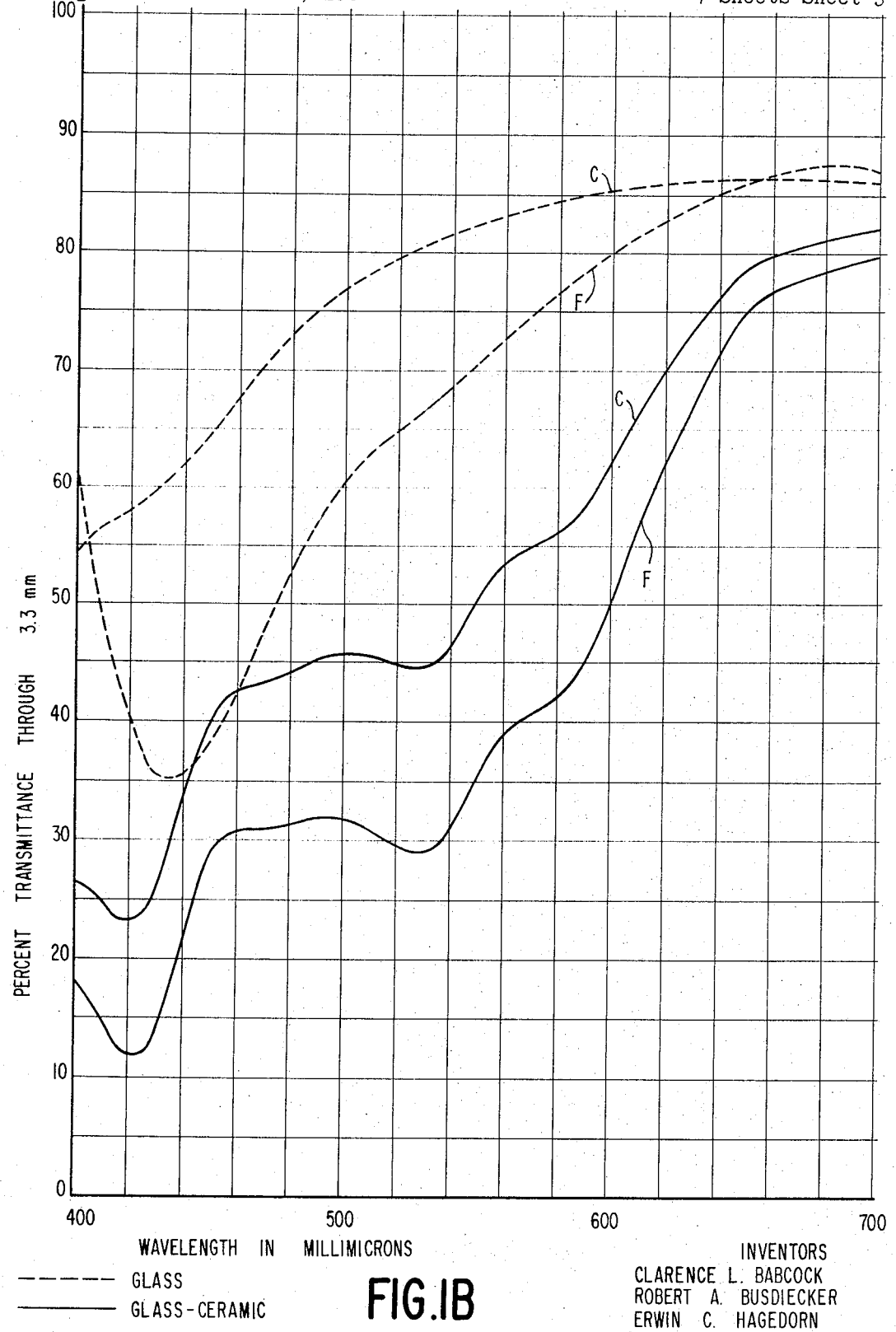

3,788,865
CRYSTALLIZED GLASS CERAMICS AND PROCESS FOR FORMING SAME
Clarence L. Babcock, 1718 Potomac, Toledo, Ohio 43607; Robert A. Busdiecker, 414 W. 1st St., Woodville, Ohio 43469; and Erwin C. Hagedorn, 513 Ansonia, Oregon, Ohio 43616
Continuation of application Ser. No. 464,147, June 15, 1965, which is a continuation-in-part of application Ser. No. 386,693, July 31, 1964, both now abandoned. This application Sept. 8, 1970, Ser. No. 70,500
Int. Cl. C03c 3/04, 3/20, 3/22
U.S. Cl. 106—39.7     27 Claims

ABSTRACT OF THE DISCLOSURE

Colored and/or transparent, low-expansion, crystallized glass-ceramics formed by thermal in situ crystallization from a differently colored crystallizable base glass and having lithium-containing crystals as the predominant crystalline species. The products have coefficients of thermal expansion of less than about $12 \times 10^{-7}$ per ° C. over the range of 0 to 300° C. Telescope mirror blanks can be made from the transparent, low-expansion, crystallized glass ceramics.

---

Figure 1:
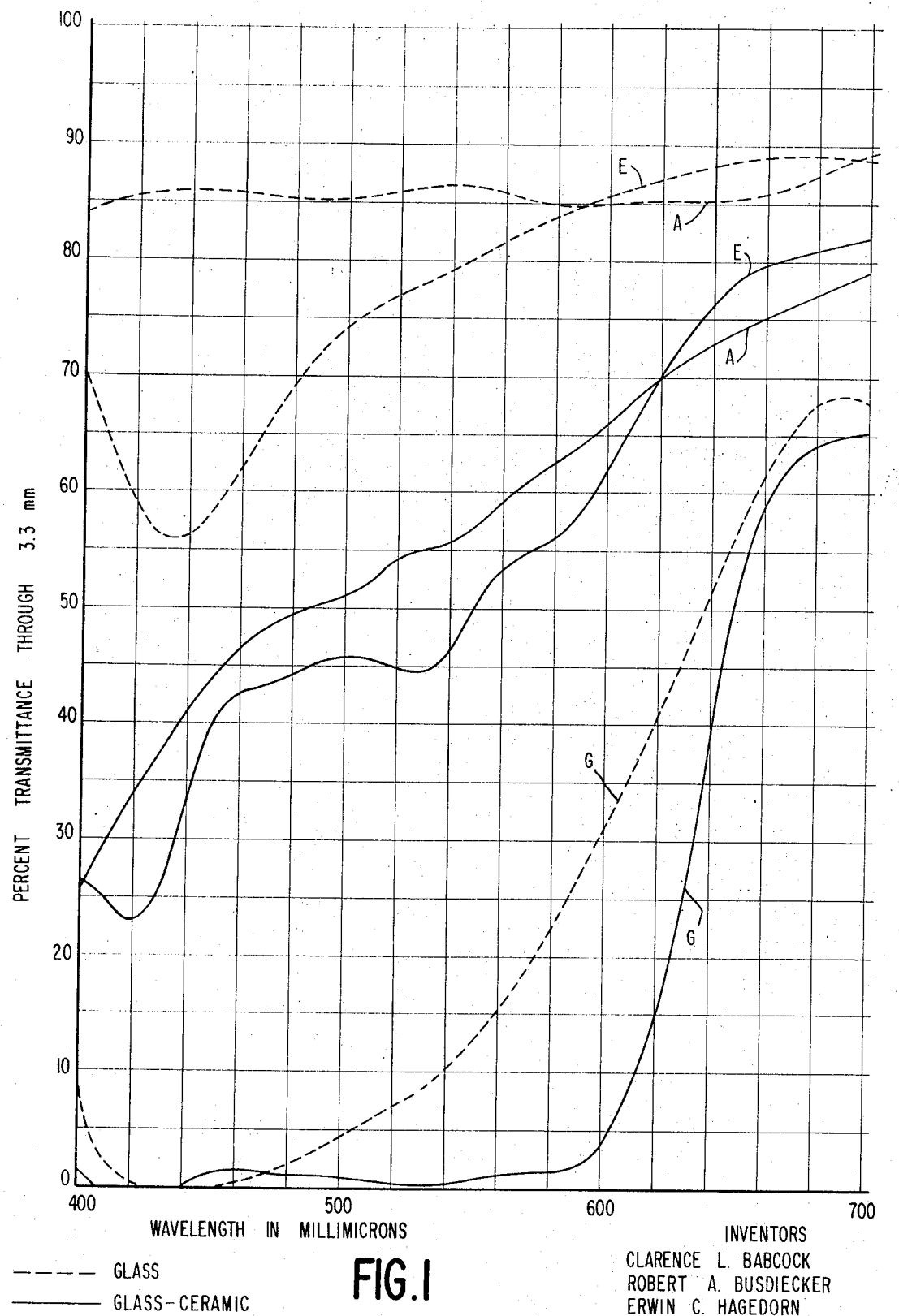

This application is a continuation of copending application Ser. No. 464,147, filed June 15, 1965, now abandoned, which, in turn, was a continuation-in-part of patent application Ser. No. 386,693, filed July 31, 1964, now abandoned.

This invention relates to colored, transparent, crystallized glass-ceramics having low thermal expansion characteristics, and, more particularly, to colored, transparent, in situ crystallized glass-ceramics of low expansion whose color is different from the color of the crystallizable glass compositions from which they are made. In one aspect, the invention relates to colored, transparent, low expansion, crystallized glass-ceramics formed by controlled, in situ thermal crystallization of crystallizable glass compositions of the $SiO_2$-$Al_2O_3$-$Li_2O$ system containing known colorants for the glass, but which, upon crystallization, produce different and unexpected colors in the glass-ceramics. In another aspect, the invention relates to particular transparent, crystallized glass-ceramics which exhibit a minor, almost negligible change in the coefficient of thermal expansion as the glass is thermally crystallized under controlled conditions and while different areas of the glass are within a relatively wide temperature range, thus permitting the formation of transparent, crystallized glass-ceramics having a substantial thickness and a substantially uniform coefficient of thermal expansion throughout the thickness. In still another aspect the invention relates to new and novel crystallizable glass compositions, to transparent crystallized low expansion glass-ceramics, both colored and uncolored, made therefrom by in situ thermal crystallization, to opaque, low expansion crystallized ceramics made therefrom by in situ thermal crystallization, and to methods of making the aforesaid transparent and opaque crystallized ceramics.

Accordingly, it is an object of the invention to provide colored, transparent, crystallized glass-ceramics having low coefficients of thermal expansion wherein the color in glass ceramic is unexpectedly different from the color of the crystallizable glass from which the ceramic was formed by in situ thermal crystallization.

Another object of this invention is to provide a method for forming colored, transparent, crystallized glass-ceramics having low coefficients of thermal expansion by in situ, controlled crystallization of colored devitrifiable glass compositions wherein the color of the transparent glass-ceramic is unexpectedly different from that of the colored devitrifiable glass.

A further object of this invention is to provide new and novel crystallizable glass compositions, both colored and uncolored and new and novel transparent crystallized glass-ceramics having low expansion characteristics made therefrom by in situ crystallization.

Another object of this invention is to provide new and novel crystallized opaque ceramics having low expansion properties and excellent resistance to thermal shock.

Still a further object of this invention is to provide methods for heat treating crystallizable glass compositions to form transparent low expansion glass-ceramics and opaque low expansion ceramics having desirable properties which make them suitable for a wide variety of uses.

Still another object of the present invention is to provide transparent, crystallized glass-ceramic bodies having a substantial thickness and a coefficient of thermal expansion within the range of $10 \times 10^{-7}$ per ° C. to zero or below and preferably from about $3 \times 10^{-7}$ per ° C. to about zero, where such coefficients are positive or negative with increase in temperature.

A further object of this invention is to provide new and novel crystallizable glass compositions which subsequent to thermal nucleation thereof can be further heat treated over a fairly broad temperature range without any appreciable change in the final, low expansion properties imparted to the crystallized transparent glass-ceramic formed therefrom.

A further object of the present invention is to provide a method for crystallizing a glass body having a substantial thickness, by controlled in situ crystallization of the glass, wherein the outer surface of the glass can be at a temperature which is substantially different than the temperature of the inner portion of the glass, but wherein the difference in temperatures still permits the formation of a crystallized, transparent glass-ceramic having a substantially uniform coefficient of thermal expansion throughout the glass-ceramic body.

In attaining the objects of the present invention, one feature resides in forming a thermally crystallizable glass composition of the $SiO_2$-$Al_2O_3$-$Li_2O$ system containing at least one nucleating agent for the glass, such as $TiO_2$, $ZrO_2$, and the like, together with known glass colorants, such as certain metal oxides, forming a crystallized glass-ceramic by in situ thermal crystallization, where the glass-ceramic contains as predominant crystalline species lithium-containing crystalline phases, either as beta-eucryptite or beta-eucryptite-like crystals or as beta-spodumene or beta-spodumene-like crystals, or both, as indicated by X-ray diffraction data. By predominant crystalline species it is meant that these lithium-containing crystalline phases are present in greater amount by volume than any other crystalline material which is present in the claimed "crysstalline ceramic" products. The glass-ceramic which is formed is transparent in one aspect of the invention and has a color which is unexpectedly different from that of the thermally crystallizable glass composition from which it is made.

Another feature of the present invention is to provide specific crystallizable glass compositions of the $SiO_2$-$Al_2O_3$-$Li_2O$ system, whose essential components fall within relatively narrow ranges, and contain a nucleant or nucleating agent for the glass, and, by controlled in situ crystallization, forming a transparent crystallized glass-ceramic, even from a glass body of substantial thickness, wherein the coefficient of thermal expansion of the transparent glass-ceramic body is substantially uniform throughout the glass and is no higher than 10 to $12 \times 10^{-7}$ and no less than $-10$ to $-12 \times 10^{-7}$ (0–300° C.) and is preferably about zero.

Still another feature of this invention is a particular crystallizable glass composition of the $SiO_2$-$Al_2O_3$-$Li_2O$ system containing a nucleating agent and a particular colorant wherein the color of the glass body formed from the composition is amber but, upon subjecting the glass composition to a particular heating treatment, the color of the glass body unexpectedly turns to green and, upon further heat treatment, the resulting in situ crystallized transparent glass-ceramic body surprisingly has a ruby color. Similarly, another glass body, blue in color, has a purple or lavender color on crystallization. Also, another amber glass body is green when thermally in situ crystallized to a transparent glass-ceramic.

In still another embodiment of the invention, an amber glass, when converted by thermal in situ crystallization to an opaque ceramic, is surprisingly blue in color.

In a further embodiment of the invention a green glass is converted on thermal in situ crystallization to a pink transparent glass-ceramic.

Figure 2:
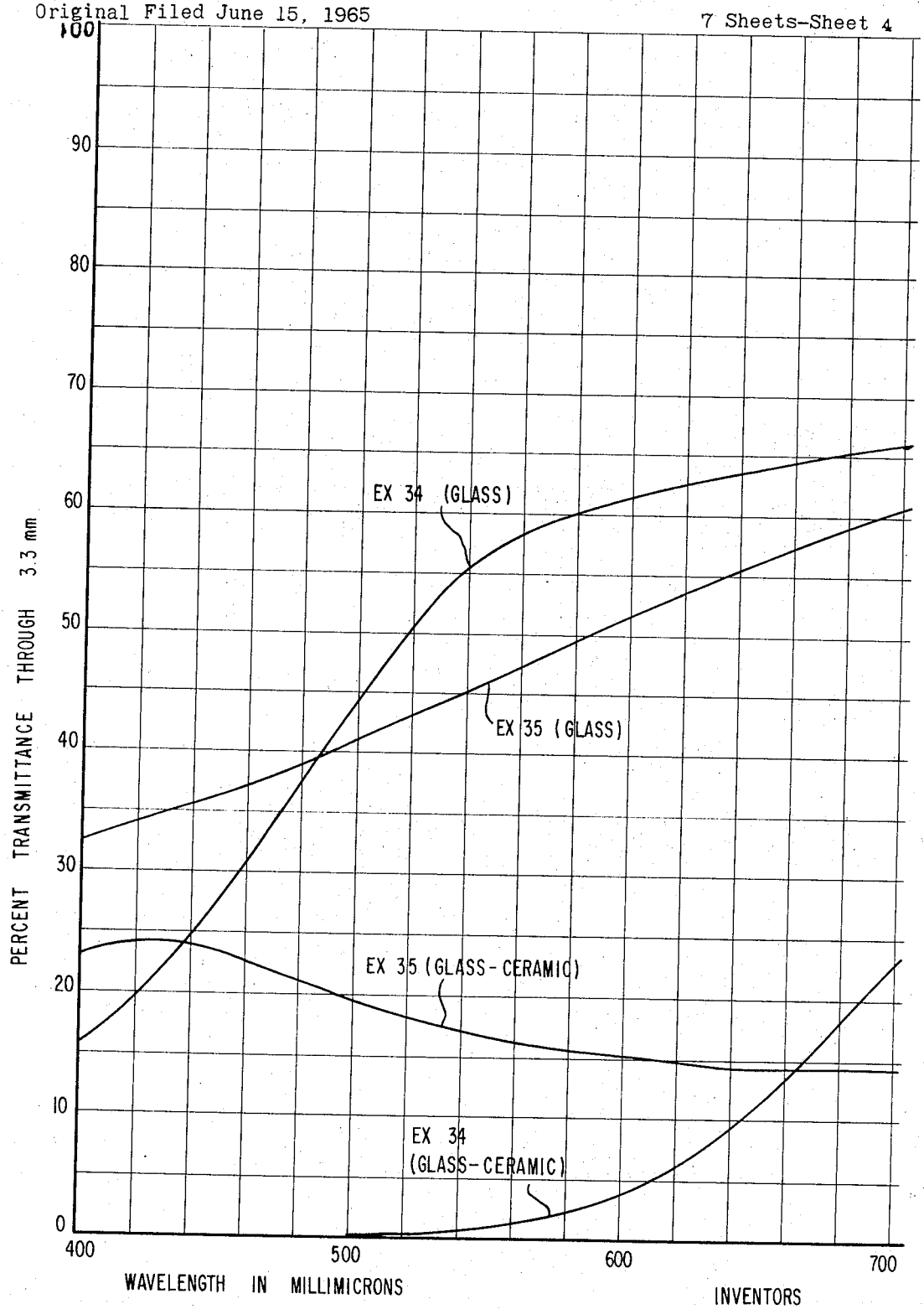
Figure 3:
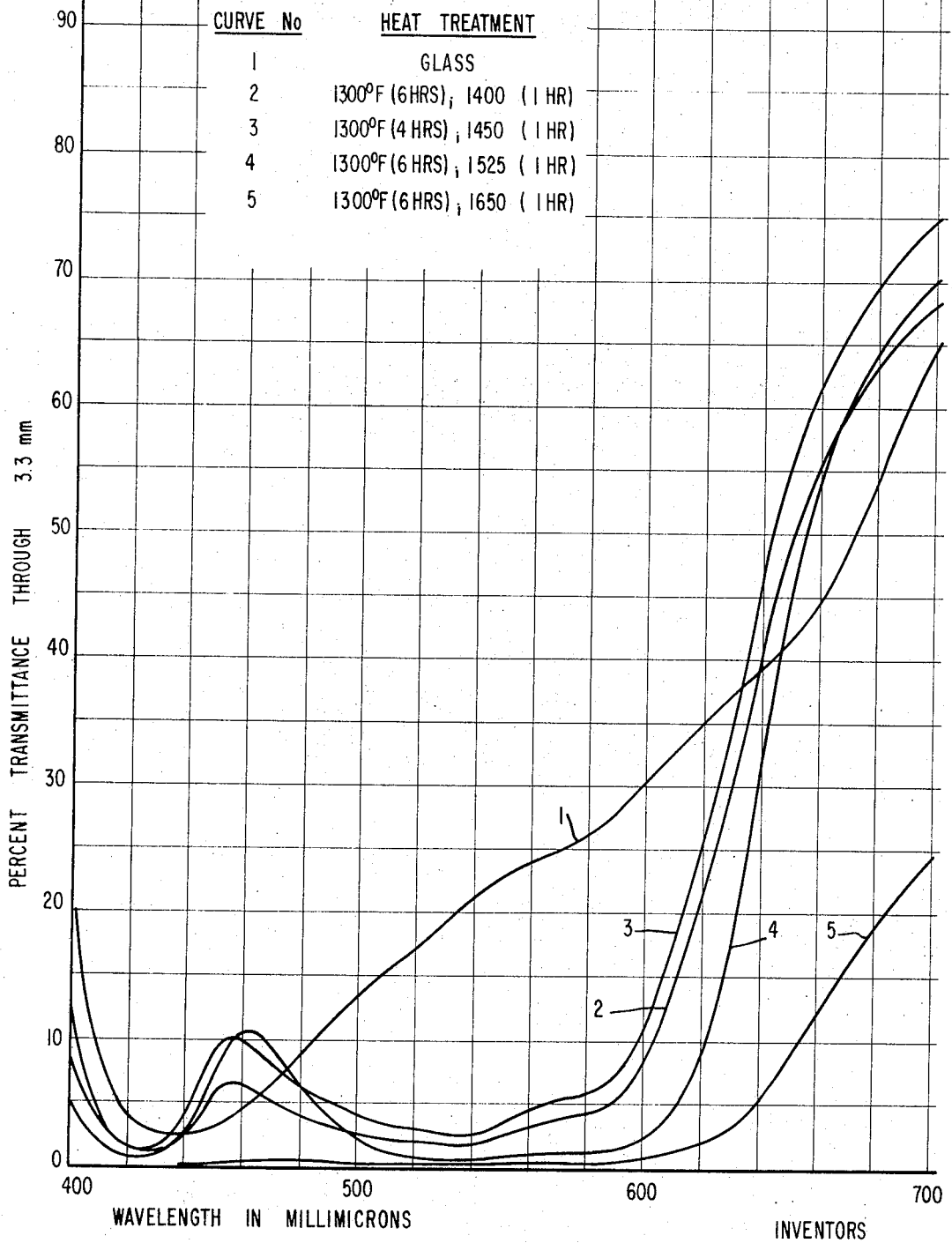

Other objects, features, and advantages of the present invention will become more apparent from the following description thereof, taken in conjunction with the accompanying drawings wherein:

FIGS. 1, 1–A and 1–B are graphs illustrating, in terms of light transmission data, the color change between a glass and a glass-ceramic of the invention made therefrom, FIG. 2 is a graph illustrating still other glass-ceramics of the invention and comparing the colors thereof, in terms of light transmission data, with the colors of the glasses from which they were formed, FIG. 3 is a graph illustrating the changes in light transmission of a glass-ceramic resulting from changes in heat treatment temperatures and times and comparing the data with that of the base glass, and FIGS. 4–8, inclusive, are graphs illustrating one embodiment of the transparent glass-ceramics of the invention, and showing the substantially uniform, low-expansion characteristics which may be imparted to the glass-ceramics over a relatively wide crystallization temperature.

The use of colorants in thermally crystallizable glass compositions to produce, upon controlled crystallization a colored opaque ceramic body is known in the art. Almost all such colored ceramics have a very light or pastel shade. Processes for forming transparent crystallized glass-ceramics are also disclosed in the prior art. It has now been discovered, however, that a crystallizable glass composition of the $SiO_2$-$Al_2O_3$-$Li_2O$ system containing at least one nucleant or nucleating agent for the composition and also a colorant for the glass, will, under proper crystallization temperatures, form an unexpectedly different colored transparent crystallized glass-ceramic of an unexpected and different color containing as predominant crystalline species lithium-containing crystalline phases, either as beta-eucryptite crystals or beta-eucryptite-like crystals or beta-spodumene or beta-spodumene-like crystals, or both, as determined by X-ray diffraction data.

According to one important aspect of the invention there is provided a partly crystalline, colored, transparent ceramic having a coefficient of lineal thermal expansion over the range from zero to 300° C. of less than $15 \times 10^{-7}$, usually less than $12 \times 10^{-7}$, and preferably less than $10 \times 10^{-7}$ formed by thermal in situ crystallization of a colored glass capable of thermal crystallization to yield as predominant in situ formed crystalline species lithium-containing crystals, in the form of beta-eucryptite or beta-eucryptite-like crystals, or beta-spodumene or beta-spodumene-like crystals, or both, said ceramic containing a multitude of such crystalline species as predominant crystalline species in random orientation throughout said ceramic and dispersed in a glassy matrix remaining as a result of said in situ crystallization, substantially all of the crystals of said ceramic having a diameter less than ⅓ micron, said ceramic having a distinctly different color than the glass from which it was formed.

The products of the invention have advantages of both glasses and conventional ceramics, since they are transparent and nonporous as is glass, and yet have a low coefficient of expansion so that very little or no expansion takes place on heating. They have the further advantage that they are stronger than most glasses because of their fine crystalline structure. Moreover, they have great esthetic value, since they can be made in a wide range of colors. Thus, cooking vessels can be made of varied transparent colors and low or zero expansion. Such vessels offer a combination of attractive colors, seeability and resistance to thermal shock such that they can be removed from a hot oven and plunged into cold water without damage.

Surprisingly, we have discovered a large number of new colored glass-ceramic that are unpredictably different in color from the colors of the glasses from which they are made. For instance, a perfectly brown amber glass containing NiO as colorant when heat treated for crystallization changes to a beatuiful transparent ruby red. On the other hand a slightly different glass, having a little less alumina and the same colorant, changes to a transparent green glass-ceramic on heat treatment. The mechanism of the color changes and the reason for the colors produced in the resulting glass-ceramics is not understood.

The colored glasses that undergo the surprising color changes, when converted to the low expansion ceramics, are capable, as stated, of forming transparent, colored, low expansion ceramics on crystallization containing the lithium-aluminum silicates before mentioned. A large number of such glasses and resulting ceramics have been found to fall within the following compositional ranges, i.e., they contain at least the following essential components in the following weight percentage limits, based on the total glass composition:

| | Weight percent |
|---|---|
| $SiO_2$ | 50–75 |
| $Al_2O_3$ | 16–35 |
| $Li_2O$ | 3–5.5 |
| Colorants | 0.005–2 |
| Nucleating agent | Variable |
| $Li_2O$+nucleating agent | At least 5.5 |

The particular amount of nucleating agent cannot be defined with precision, as it depends on the particular composition, the particular nucleating agent or combination of nucleating agents, etc. Many such glass compositions of the foregoing table can be thermally in situ crystallized to obtain opaque glass-ceramics with large crystals. However, it has been found to be necessary to have present a "nucleating agent," hereinafter defined, in order to obtain small enough crystals so that the resulting colored ceramic is transparent. Therefore, the amount of nucleating agent necessary is that amount that will yield a thermally in situ crystallized product having substantially all of its crystals of a size less than ⅓ micron in diameter. As will be seen later, this size is preferably less than ¼ micron and is ideally less than about 0.1 micron.

Among the common nucleating agents that have been found to be effective are $TiO_2$, $ZrO_2$ and $SnO_2$. Usual total amounts of nucleants (e.g. $TiO_2+ZrO_2+SnO_2$) are a total of 2 to 10 weight percent of the glass composition. $TiO_2$ is usually employed in amounts up to about 10 weight percent, $ZrO_2$ in amounts up to about 5 weight percent and $SnO_2$ in amounts up to about 5 weight percent. The lower limit of 2 weight percent nucleants is only a usual lower limit; thus $Cr_2O_3$ in amounts of about 0.2 weight percent, together with less than two percent of another nucleant such as about 1 percent of $ZrO_2$ can be employed as nucleants. It will be noted that $Cr_2O_3$ can dually serve as a colorant and a nucleant in some instances.

Particularly useful nucleants are $ZrO_2$, $SnO_2$ and $TiO_2$, singly or in combination, where $ZrO_2$ is used in amounts up to 3 weight percent, $SnO_2$ in amounts up to 3 weight percent and TiO$_2$ in amounts up to 2.5 weight percent, and when combinations are used, a maximum of 5 weight percent is usually employed. Broadly, much wider ranges of these three nucleants can be employed, as noted hereafter in Table II. Especially useful is a combination of 1 to 2.5 percent TiO$_2$ with 1 to 2 percent ZrO$_2$. In most instances when the nucleants are selected from SnO$_2$, TiO$_2$ and ZrO$_2$ a minimum of 2.5 weight percent of one or a combination of these oxides is employed.

Other components often present in the present compositions are B$_2$O$_3$, P$_2$O$_5$, alkaline earth oxides, ZnO, Na$_2$O, and F (present as a fluoride), in the amounts shown in Table II. Also, small amounts of residual arsenic and antimony oxides are often present in the compositions, since arsenic and antimony compounds are often used as fining agents. In actual practice, arsenic, expressed as As$_2$O$_3$ is usually present in amounts of not more than 0.3 weight percent, and antimony, expressed as Sb$_2$O$_5$, is seldom present in amounts over 1 weight percent. Other compatible inorganic oxides can also be present in glasses useful in this aspect of the invention.

The colorant oxides which are usually used to form the transparent colored glass-ceramics of the present invention include the oxides of the transition elements V, Cr, Mn, Fe, Co and Ni with the preferred colorants being iron oxide expressed as Fe$_2$O$_3$, cobalt oxide expressed as CoO, nickel oxide expressed as NiO, vanadium oxide expressed as V$_2$O$_5$ and chromium oxide expressed as Cr$_2$O$_3$. As will be seen from the data, infra, unexpected colors are obtained in the crystallized glass-ceramic when these colors are used per se and also in combination with each other or with other colorants, such as CuO, MnO and S$^=$ (usually obtained from zinc sulfide). These colorants have been known to impart specific colors to base glass compositions, and some of them have been used in making pastel colored opaque ceramic articles from crystallizable glass compositions. It has now been discovered that if these colorant oxides, per se, or mixtures thereof are incorporated into an appropriate thermally crystallizable glass composition and the composition is thermally crystallized in situ, a transparent low expansion glass-ceramic having an unexpected color is formed which contains as the predominant crystalline phases, lithium-containing crystalline phases, either as beta-eucryptite or beta-eucryptite-like crystals, or as beta-spodumene or beta-spodumene-like crystals, or both, as indicated by X-ray diffraction data.

Summarizing, most useful compositions to make the colored transparent ceramics of the invention contain the following components, in the following weight percentage limits, based on the total composition:

TABLE II

| | Weight percent |
|---|---|
| SiO$_2$ | 50–75 |
| Al$_2$O$_3$ | 16–35 |
| Li$_2$O | 3–5.5 |
| B$_2$O$_3$ | 0–9 |
| ZrO$_2$ | 0–5 |
| TiO$_2$ | 0–10 |
| SnO$_2$ | 0–5 |
| P$_2$O$_5$ | 0–3 |
| F$_2$ | 0–0.2 |
| Na$_2$O | 0–2 |
| ZnO | 0–4 |
| Colorants | 0.005–2 |
| Alkaline earth oxides | 0–4.5 |
| (ZrO$_2$+TiO$_2$+SnO$_2$) | Not over 10 |
| (SiO$_2$+Al$_2$O$_3$) | 75–92 | where the glass and ceramic compositions contain 94 to 100 weight percent of the components named in Table II, the other 6 to zero weight percent being other compatible inorganic ingredients, usually oxides or sulfides.

"Nucleating agents" are materials which have the effect in the glass, when properly heat treated, of causing the formation of larger numbers of homogeneously dispersed crystals in the glass than in their absence. It appears probable that the glasses used in the present invention first form a microscopic or sub-microscopic dispersed glass phase, and that this disperse phase somehow initiates the formation of the main crystalline species, in some manner enabling the major crystalline species to crystallize substantially homogeneously throughout the mass of glass being heat treated, and helping to limit the maximum size of the crystals by providing many sites for crystal initiation.

In making the colored transparent in situ crystallized glass-ceramics of the present aspect of the invention or the transparent glass-ceramics of the aspect of the invention later described, one first selects and melts a suitable glass composition containing sufficient nucleant to produce a transparent low expansion glass-ceramic on in situ thermal crystallization. The glass is formed into any desired shape and then heat treated for crystallization to obtain the transparent ceramic. The optimum heat treatment depends, as will be understood, on the particular glass composition, the ratio of its ingredients and the type and amount of its nucleants, as well as the final properties desired. Therefore, it is not possible to specify a heat treatment schedule that will be common to all of the glasses of the invention. However, it is usually preferred that the first heat treatment step be a relatively low temperature heat treatment that is in the region of maximum or high rate of nuclei or crystallite formation, wherein "nuclei" are defined as submicroscopic precursors of crystalline species or as a finely dispersed submicroscopic immiscible glassy phase. It is difficult to measure directly the area or range of temperatures in which the maximum rates of nuclei formation occurs, or in other words where the optimum temperatures for the initial heat treatment is to be located. However, this temperature usually lies in the range from 30 F. below the annealing point of the glass to 250° F. above the annealing point of the glass.

Annealing point temperature can be determined by ASTM Designation C336–54T, with the testing apparatus being calibrated using fibers of standard glasses having known annealing and strain points as specified and published by the National Bureau of Standards.

In most instances to make a transparnt glass-ceramic the glass is heated within the foregoing initial temperature range for a time of at least 15 minutes, usually at least one hour, after which it is heated at a higher temperature to complete crystallization to the desired degree, at least until the lineal coefficient of thermal expansion is at least as low as 12×10$^{-7}$. The maximum temperature for this last treatment step is usually not more than 350° F. above the annealing point temperature, although higher temperatures can be employed so long as the glass-ceramic remains transparent, with substantially all of the crystals therein having a diameter less than ⅓ micron. Times vary from substantially zero at the maximum temperature employed (simply heating to a higher temperature and then cooling) to many hours of even days. It will be understood that, for a given degree of crystallization times vary generally inversely with temperature.

While a second or higher temperature is often employed after the initial nucleating heat treatment step, it is usually possible to complete the crystallization to form the transparent, low expansion glass-ceramic by effecting the entire heat treatment at the same low temperature as the initial or nucleating heat treatment temperature, or even at a lower temperature so long as this is not more than 30° F. below the annealing point. Naturally, the heat treatment at such low temperatures will take longer time than if the temperature were raised for the final crystallization. Total heat treatment times in this embodiment can be as short as ½ hour or as long as many weeks. Such low temperature "isothermal" heat treatments tend to give a product having thick sections with more uniform coefficients of thermal expansion throughout the cross-section of the article. Also, such products tend to be more highly transparent and to have a smaller crystal size.

In a typical example of the invention, the following batch materials were melted at a glass temperature of about 2900° F. for about 72 hours in a gas-fired refractory furnace using a slight excess of air for an oxidizing atmosphere. The batch is shown below with the composition in parts by weight:

BATCH

| | | Glass composition | Parts by wt. |
|---|---|---|---|
| Petalite [1] | 527 lbs | $SiO_2$ | 63.5 |
| | | $Al_2O_3$ | 20.6 |
| Zircon sand | 19 lbs., 11 oz | $Li_2O$ | 3.9 |
| Alcoa alumina [2] | 49 lbs., 15 oz | CaO | 2.7 |
| Boric acid [3] | 41 lbs., 12 oz | ZnO | 1.3 |
| High calcium lime | 31 lbs., 15 oz | $B_2O_3$ | 3.4 |
| Zinc oxide | 8 lbs., 3 oz | $TiO_2$ | 1.8 |
| Lithium carbonate | 7 lbs., 8 oz | $ZrO_2$ | 2 |
| Titanox [4] | 11 lbs., 12 oz | | |
| Black nickel oxide | 2 lbs., 10 oz | CoO | 0.05 |
| Cobalt oxide ($Co_3O_4$) | 5.5 oz | NiO | 0.4 |
| Arsenic oxide ($As_2O_3$) | 1 lb., 10 oz | | |
| Niter | 1 lb., 10 oz | $Na_2O$ | 0.4 |
| | | $As_2O_3$ | |

[1] 4.2% $Li_2O$, 16.1% $Al_2O_3$, 77.7% $SiO_2$, 0.4% $Na_2O$, 0.2% $K_2O$, 0.027% $Fe_2O_3$, and other minor impurities, including ignition loss.
[2] 99.5% $Al_2O_3$, 0.03% $Fe_2O_3$, 0.1% $Na_2O$, 0.08% $SiO_2$, 0.2+% ignition loss.
[3] 56.2% $B_2O_3$.
[4] Substantially pure $TiO_2$.

Glass bodies were formed from the melt and had an amber color. The glasses were then thermally crystallized by rapidly heating them to 1300° F. in a furnace, holding at that temperature for two hours, then increasing the temperature at the rate of 4–5° F. per minute to 1500° F. and holding at 1500° F. for 1 hour. The bodies were then cooled at the rate of about 5° F. per minute. The color of the bodies was now ruby and the bodies were transparent. From X-ray diffraction analyses and from the low expansions it was determined that the transparent ruby bodies were substantially crystallized and the predominant crystalline phase was beta-eucryptite crystals or beta-eucryptite-like crystals. The resulting ceramics had coefficients of expansion of $0.7 \times 10^{-7}$ (0.300° C.).

Other glass bodies of the same composition were subjected to another heat treatment by rapidly increasing their temperatures to 1300° F. and holding them there for 2 hours before gradually increasing their temperature at the rate of 4–5° F. per minute to 2000° F., then holding them at this temperature for an additional one hour period, then slowly cooling. Light blue opaque ceramic bodies were formed having a lineal coefficient of thermal expansion of $13.1 \times 10^{-7}$ over the range of zero to 300° C.

Following in Table III are further illustrative specific examples of colored glasses and the low-expansion transparent glass ceramics of different colors formed therefrom by subjecting them to the indicated heat treatments. Also, other heat treatments are shown for obtaining opaque ceramics having the pastel colors shown.

TABLE III

| | Ex. 1 | Ex. 2 | Ex. 3 | Ex. 4 | Ex. 5 |
|---|---|---|---|---|---|
| Ingredients, compositions in weight percent: | | | | | |
| $SiO_2$ | 61.3 | 64.8 | 60.4 | 63.5 | 62.9 |
| $Al_2O_3$ | 24.6 | 24.9 | 24 | 20.6 | 21. |
| $Li_2O$ | 4.4 | 5 | 4.2 | 3.9 | 3.8. |
| CaO | | | 1.3 | 2.7 | 2.7. |
| ZnO | 0.8 | | 1.2 | 1.3 | 1.2. |
| $B_2O_3$ | 3.4 | | 3.2 | 3.4 | 3.4. |
| $TiO_2$ | 1.4 | 5 | 1.5 | 1.8 | 1.8. |
| $ZrO_2$ | 3.5 | | 3 | 2 | 1.8. |
| CoO | 0.03 | 0.04 | 0.04 | 0.05 | 0.04. |
| NiO | | 0.3 | 0.4 | 0.4 | 0.4. |
| $Fe_2O_3$ | | | 0.02 | | 0.04. |
| $Na_2O$ | 0.4 | | 0.7 | 0.4 | 0.9. |
| $K_2O$ | | | | | 0.1. |
| $As_2O_3$ | 0.1 | | 0.1 | | 0.1. |
| Properties: | | | | | |
| Liquidus, ° F | 2,575 | | | | 2,400. |
| Log η at liquidus | 2.89 | | | | 3.54. |
| Transparent glass-ceramic: | | | | | |
| Heat treatment, ° F. (hrs.) | 1,200 (2) / 1,450 (1) | 1,600 (1) | 1,250 (2) / 1,450 (1) | 1,300 (2) / 1,500 (1) | 1,300 (4) / 1,450 (1). |
| α (0–300° C.)×$10^7$ | 0.0 | | | 0.7 | 0.2. |
| Color of glass | Blue | Amber | Amber | Amber | Amber. |
| Color of transparent devitrified glass ceramic | Lavender | Cranberry red | Cranberry red | Cranberry red | Cranberry red. |
| Color of opaque ceramic | Very pale blue | | Light blue | Light blue | Light blue. |
| Opaque-ceramic: | | | | | |
| Heat treatment ° F. (hrs.) | 1,250 (2) / 1,575 (2) / 2,000 (1) | | 1,250 (2) / 2,000 (1) | 1,300 (2) / 1,300 (2) | 1,300 (2) / 1,300 (2) / 1,850 (1). |
| α (0–300° C.)×$10^7$ | | | | 13.1 | |

| | Ex. 6 | Ex. 7 | Ex. 8 | Ex. 9 | Ex. 10 |
|---|---|---|---|---|---|
| Ingredients, compositions in weight percent: | | | | | |
| $SiO_2$ | 63.8 | 65.2 | 63.2 | 62.9 | 63.4. |
| $Al_2O_3$ | 20.3 | 18.6 | 20.6 | 21 | 20.7. |
| $Li_2O$ | 3.6 | 4 | 3.9 | 3.9 | 3.9. |
| CaO | 2.8 | 2.5 | 2.7 | 2.7 | 2.7. |
| ZnO | 1.1 | 1.3 | 1.3 | 1.3 | 1.3. |
| $B_2O_3$ | 3.4 | 3.3 | 3.4 | 3.3 | |
| $TiO_2$ | 1.8 | 1.8 | 1.8 | 1.6 | 1.8. |
| $ZrO_2$ | 2.2 | 2 | 2 | 2.3 | 2. |
| BaO | | | | | 3.4. |
| CoO | 0.05 | | | 0.04 | 0.05. |
| NiO | 0.4 | 0.8 | 0.8 | 0.3 | 0.4. |
| $Fe_2O_3$ | | 0.03 | | 0.01 | |
| $Na_2O$ | 0.6 | 0.4 | 0.4 | 0.6 | 0.4. |
| $Cr_2O_3$ | | | | | |
| $K_2O$ | | | | 0.1 | |
| $As_2O_3$ | 0.1 | | | 0.1 | |
| Properties: | | | | | |
| Liquidus, ° F | | | | | 2,445. |
| Log η at liquidus | | | | | 3.61. |
| Transparent glass-ceramic: | | | | | |
| Heat treatment, ° F. (hrs.) | 1,300 (6) / 1,450 (1) | 1,300 (2) / 1,450 (1¼) | 1,300 (4) / 1,450 (1) | 1,300 (4) / 1,450 (1) | 1,300 (2) / 1,550 (1). |
| α (0–300° C.)×$10^7$ | 1.4 | 10.1 | | 0.2 | 3.6. |
| Color of glass | Amber | Amber | Amber | Amber | Amber. |
| Color of transparent devitrified glass ceramic | Cranberry red | Lime green | Ruby | Cranberry red | Amber-brown. |
| Color of opaque ceramic | Light blue | Light green | Light blue | Light blue | Gray. |
| Opaque-ceramic: | | | | | |
| Heat treatment, ° F. (hrs.) | 1,300 (2) / 1,350 (2) / 1,850 (1) | 1,300 (2) / 1,350 (2) / 1,450 (2) / 1,850 (1) | 1,300 (4) / 1,450 (1) / 1,850 (1) | 1,300 (2) / 1,350 (2) / 1,450 (2) / 1,850 (1) | 1,300 (2) / 1,850 (1). |
| α (0–300° C.)×$10^7$ | | | | | 13.8. |

| | Ex. 11 | Ex. 12 | Ex. 13 | Ex. 14 | Ex. 15 |
|---|---|---|---|---|---|
| Ingredients, compositions in weight percent: | | | | | |
| $SiO_2$ | 66.7 | 63.4 | 65.3 | 65.5 | 58.4 |
| $Al_2O_3$ | 20.8 | 20.7 | 20.9 | 20.9 | 19.8 |
| $Li_2O$ | 3.9 | 3.9 | 3.9 | 3.9 | 4.4 |
| CaO | 2.7 | 2.7 | 2.7 | 2.7 | |
| ZnO | 1.3 | | 1.3 | 1.3 | 3.5 |
| $B_2O_3$ | | 3.4 | 3.4 | 3.4 | 8.4 |
| $TiO_2$ | 1.8 | 1.8 | | | 1.5 |
| $ZrO_2$ | 2 | 2 | 2 | 1.8 | 3.5 |
| BaO | | 1.3 | | | |
| CoO | 0.05 | 0.05 | | | 0.04 |
| NiO | 0.4 | 0.4 | | | 0.3 |
| $Fe_2O_3$ | | | | | |
| $Na_2O$ | 0.4 | 0.4 | 0.2 | 0.2 | 0.2 |
| $Cr_2O_3$ | | | 0.2 | 0.2 | |
| $K_2O$ | | | 0.1 | 0.1 | |
| $As_2O_3$ | | | | | |
| $P_2O_5$ | | | | | |
| PbO | | | | | |
| Properties: | | | | | |
| Liquidus, °F | 2,425 | | | | |
| Log η at liquidus | 3.91 | | | | |
| Transparent glass-ceramic: | | | | | |
| Heat treatment, °F. (hrs.) | 1,300(2); 1,550(1) | 1,300(2); 1,550(1) | 1,300(2); 1,450(2); 1,800(1) | 1,300(2); 1,450(2); 1,800(1) | 1,200(30); 1,350(1) |
| α(0–300° C.) ×10⁷ | −3.1 | | | | |
| Color of glass | Amber | Amber | Green | Green | Amber |
| Color of transparent devitrified glass ceramic | Ruby | Ruby | Pink | Pink | Ruby |
| Color of opaque ceramic | Light blue | Light blue | | | Blue-gray |
| Opaque-ceramic: | | | | | |
| Heat treatment °F. (hrs.) | 1,300(2); 1,500(2); 1,900(1) | 1,300(2); 1,300(2) | | | 1,300(4); 1,600(1) |
| α (0–300° C.) ×10⁷ | 9.1 | | | | |

| | Ex. 16 | Ex. 17 | Ex. 18 | Ex. 19 | Ex. 20 |
|---|---|---|---|---|---|
| Ingredients, compositions in weight percent: | | | | | |
| $SiO_2$ | 65.6 | 65.9 | 65.3 | 64.7 | 64.2 |
| $Al_2O_3$ | 24.8 | 17.2 | 17.9 | 18.7 | 19.6 |
| $Li_2O$ | 4.2 | 4 | 4 | 4 | 3.9 |
| CaO | | 2.8 | 2.8 | 2.8 | 2.8 |
| ZnO | 1 | 1.3 | 1.3 | 1.3 | 1.3 |
| $B_2O_3$ | | 3.6 | 3.5 | 3.5 | 3.5 |
| $TiO_2$ | 1.5 | 1.9 | 1.9 | 1.9 | 1.8 |
| $ZrO_2$ | 2.2 | 2.1 | 2.1 | 2 | 2 |
| BaO | | | | | |
| CoO | 0.03 | | | | |
| NiO | 0.3 | 0.8 | 0.8 | 0.8 | 0.8 |
| $Fe_2O_3$ | | | | | |
| $Na_2O$ | 0.2 | 0.4 | 0.4 | 0.4 | 0.4 |
| $Cr_2O_3$ | | | | | |
| $K_2O$ | 0.1 | | | | |
| $As_2O_3$ | | | | | |
| $P_2O_5$ | | | | | |
| PbO | | | | | |
| Properties: | | | | | |
| Liquidus, °F | 2,590 | | | | |
| Log η at liquidus | 3.38 | | | | |
| Transparent glass-ceramic: | | | | | |
| Heat treatment, °F. (hrs.) | 1,300(15); 1,550(1) | 1,250(64); 1,400(1) | 1,250(64); 1,400(1) | 1,450(64); 1,450(1) | 1,250(64); 1,450(1) |
| α (0–300° C.) ×10⁷ | −11.8 | | | | |
| Color of glass | Amber | Light amber | Amber | Amber | Amber |
| Color of transparent devitrified glass ceramic | Ruby | Lime green[a] | Lime green[a] | Lime green | Cranberry red |
| Color of opaque ceramic | Blue-gray | Pale green | Pale green | Green | Blue |
| Opaque-ceramic: | | | | | |
| Heat treatment, °F. (hrs.) | 1,300(6); 1,550(1); 1,900(1) | 1,250(64); 1,600(1) | 1,250(64); 1,600(1) | 1,250(64); 1,600(1) | 1,250(64); 1,600(1) |
| α(0–300° C.) ×10⁷ | | | | | |

| | Ex. 21 | Ex. 22 | Ex. 23 | Ex. 24 | Ex. 25 |
|---|---|---|---|---|---|
| Ingredients, compositions in weight percent: | | | | | |
| $SiO_2$ | 58.2 | 73.3 | 54.3 | 64.8 | 62.7 |
| $Al_2O_3$ | 28.1 | 16.1 | 34.4 | 24.9 | 24.9 |
| $Li_2O$ | 4.8 | 4.3 | 5.5 | 5 | 7.1 |
| CaO | | | | | |
| ZnO | | | | | |
| $B_2O_3$ | | | | | |
| $TiO_2$ | 1.8 | 6 | 5.5 | | 5 |
| $ZrO_2$ | 2.3 | | | | |
| BaO | | | | | |
| CoO | 0.038 | 0.038 | 0.038 | 0.04 | 0.04 |
| NiO | 0.3 | 0.3 | 0.3 | 0.3 | 0.3 |
| $Fe_2O_3$ | | | | | |
| $Na_2O$ | 0.2 | | | | |
| $Cr_2O_3$ | | | | | |
| $K_2O$ | 0.9 | | | | |
| $As_2O_3$ | | | | | |
| $P_2O_5$ | 2.8 | | | | |
| PbO | 0.6 | | | | |
| $SnO_2$ | | | | 5 | |
| Properties: | | | | | |
| Liquidus, °F | | | | | |
| Log η at liquidus | | | | | |
| Transparent glass-ceramic: | | | | | |
| Heat treatment, °F. (hrs.) | 1,300(16); 1,550(1) | 1,250(1); 1,472(2); 1,616(2) | 1,292(2); 1,472(2) | 1,650(1) | 1,300(1), then 1,600(1).[c] |
| α(0–300° C.)×10⁷ | | | | | |
| Color of glass | Amber | Amber then green[b] | Amber | Amber | Amber then green |
| Color of transparent devitrified glass ceramic | Cranberry red | Cranberry red | Purple | Cranberry red | Cranberry red |
| Color of opaque ceramic | Blue | Light blue | Blue | | |
| Opaque-ceramic: | | | | | |
| Heat treatment, °F. (hours) | 1,300(1); 1,900(1) | 1,475(2); 2,100(2) | 1,650(2); 2,000(2) | | |

[a] Not transparent.
[b] Amber glass becomes green glass.
[c] After 1,300° F. for 1 hr. amber glass became a green glass.

In each of the above examples the increase in temperature from one range to the other is at the rate of about 5° F. per minute and the glass or glass-ceramic is held at the particular temperature for the period of hours indicated in parentheses.

From a review of the above table it will be noted that the color of the glass body changes unexpectedly when the glass is thermally crystallized to a transparent glass-ceramic. Thus in Example 1, the use of a small amount of CoO produces a blue color in the glass, which would be expected. However, the transparent glass ceramic has a lavender color, which is totally unexpected. In Examples 3–6, inclusive, the combination of CoO and NiO colorants produces amber colored glasses but ruby or cranberry red transparent glass-ceramics on crystallization. In Example 7, the presence of NiO colorant results in a green transparent glass ceramic which is an unexpected color for NiO, while in Example 8, a slight increase in the amount of $Al_2O_3$, all other components remaining substantially the same, produces a ruby color in the glass-ceramic, which, again, is a color that certainly would not be expected.

A series of four additional compositions were made and tested, see Examples 17–20 wherein, all factors being substantially constant with the exception of $Al_2O_3$, green glass-ceramics were formed with all compositions except Example 20 which contained sufficient alumina to cause the glass-ceramic to turn to a cranberry or ruby color. It now appears that the ratio of $SiO_2$ to $Al_2O_3$ must be no greater than 3.3 parts by weight $SiO_2$ to 1 part $Al_2O_3$ in order to get a cranberry or ruby color instead of the green color in the transparent glass-ceramic in this particular series. Note, however, that a red color is obtained in Example 22 with a high $SiO_2$ to $Al_2O_3$ ratio in a somewhat different composition.

In Example 10, the mixture of NiO and CoO gives an amber transparent glass-ceramic whereas in Example 11, which is substantially identical to Example 10, except that it does not contain any BaO, a transparent ruby glass is obtained. Thus when the amount of alkaline earth oxides in the composition exceeds 4.5% by weight of the composition, it has an inhibiting effect on the development of a red color in the transparent glass-ceramic.

It is known that $Cr_2O_3$ in a glass produces a green color. However, when up to about 0.2 percent $Cr_2O_3$ is present as the colorant in a crystallizable glass having a nucleant other than $TiO_2$, a pink transparent glass-ceramic is unexpectedly produced, as evidenced by Examples 13 and 14.

When the amber glass composition of Example 22 containing a mixture of NiO and CoO was subjected to a temperature of 1250° F. for 1 hour, a green glass was unexpectedly formed which, upon being subjected to a further heat treatment of 1475° F. for 2 hours and 1620° F. for 2 hours formed a transparent crystallized glass-ceramic having a cranberry red color. The same results were obtained with the composition of Example 25.

A better exposition of the color changes which occur between the crystallizable glasses and the crystallized glass-ceramics will be obtained from the graphs in FIGS. 1, 1a and 1b wherein various colorants have been added to the following base glass composition:

TABLE IV

|  | Percent by weight |
|---|---|
| $SiO_2$ | 64 |
| $Al_2O_3$ | 20.9 |
| $Li_2O$ | 3.9 |
| CaO | 2.7 |
| ZnO | 1.3 |
| $B_2O_3$ | 3.4 |
| $TiO_2$ | 1.8 |
| $ZrO_2$ | 2 |

The colorants in each of the glasses A–G, inclusive, are as follows:

TABLE V.—COLOR

| Example | Colorant | Glass | Glass-ceramic | Percent by weight |
|---|---|---|---|---|
| A | CoO | Blue to | Pink | 0.006 |
| B | CoO | Blue to | Lavender | 0.1 |
| C | $Fe_2O_3$ | Flint to | Yellow | 0.125 |
| D | MnO | Flint to | Yellow | 0.2 |
| E | NiO | Yellow to | Salmon pink | 0.05 |
| F | NiO | Yellow to | Coral | 0.1 |
| G | NiO | Amber to | Ruby | 0.8 |

It is evident that there is a dramatic change in the transmission curves of the visible light in the 400 to 700 millimicron range between the glasses and the glass-ceramic and the visual color change is set forth for each glass and glass-ceramic in Table V, supra.

To further show the unexpectedly different colors which can be obtained by using combinations of colorants, the various colorants set forth in Examples 26–35, inclusive, of Table VI were incorporated in the base crystallizable glass composition of Table IV in the weight percent indicated in Table VI.

TABLE VI

| Colorants | Ex. 26 | Ex. 27 | Ex. 28 | Ex. 29 | Ex. 30 |
|---|---|---|---|---|---|
| CoO | 0.006 | 0.006 | 0.006 | 0.006 | 0.006 |
| NiO | 0.05 | | | | |
| $Cr_2O_3$ | | 0.013 | | | |
| $Fe_2O_3$ | | | 0.13 | | |
| MnO | | | | 0.5 | |
| S=(added as ZnS) | | | | | |
| CuO | | | | | 0.4 |
| $V_2O_5$ | | | | | |

| C.I.E. data for ⅛ inch thickness | Glass | Glass-ceramic | Glass | Glass-ceramic | Glass | Glass-ceramic | Glass | Glass-ceramic | Glass | Glass-ceramic |
|---|---|---|---|---|---|---|---|---|---|---|
| Brightness | 75.8 | 55.2 | 80.9 | 67.0 | 80.0 | 71.1 | 84.2 | 66.6 | 77.7 | 66.3 |
| Dominant wave length | 575.1 | 595.0 | 557.0 | 574.7 | 572.6 | 580.4 | 568.3 | 578.2 | 533.5 | 575.0 |
| Percent purity | 14.8 | 12.3 | 1.8 | 27.7 | 7.2 | 12.0 | 1.2 | 17.1 | 3.0 | 21.5 |
| Color | Light yellow | Salmon pink | Pale blue | Light yellow | Light yellow | Light pink | Light blue | Light pink | Light blue green | Light pink |

| Colorants | Ex. 31 | Ex. 32 | Ex. 33 | Ex. 34 | Ex. 35 |
|---|---|---|---|---|---|
| CoO | 0.013 | | | | |
| NiO | | 0.05 | 0.05 | | |
| $Cr_2O_3$ | | | | | |
| $Fe_2O_3$ | | 0.13 | | | |
| MnO | | | 0.5 | | |
| S=(added as ZnS) | 0.013 | | | 0.013 | 0.013 |
| CuO | | | | | |
| $V_2O_5$ | | | | 0.125 | |

| C.I.E. data for ⅛ inch thickness | Glass | Glass-ceramic | Glass | Glass-ceramic | Glass | Glass-ceramic | Glass | Glass-ceramic | Glass | Glass-ceramic |
|---|---|---|---|---|---|---|---|---|---|---|
| Brightness | 51.0 | 15.3 | 76.5 | 59.8 | 80.1 | 60.8 | 55.7 | 1.89 | 47.2 | 16.3 |
| Dominant wave length | 582.1 | 468.1 | 573.3 | 583.2 | 574.9 | 581.9 | 574.6 | 600.6 | 580.6 | 475.7 |
| Percent purity | 6.5 | 26.1 | 22.6 | 20.9 | 16.9 | 22.3 | 35.4 | 99.8 | 15.3 | 17.6 |
| Color | Light grey | Blue purple | Yellow | Salmon pink | Yellow | Salmon pink | Light olive green | Dark orange amber | Light grey | Blue |

The colored devitrifiable glasses of Examples 26–35 inclusive were subjected to temperatures of 1300° F. for 16 hours and 1450° F. for 1 hour and gradually permitted to cool at a rate of about 5° F. per minute. The colors for the glasses and for the transparent glass-ceramics are set forth in Table VI. To more clearly define the difference in color which occurs when the glass is devitrified to a transparent glass-ceramic, the C.I.E. colorimetric values for each glass and transparent glass-ceramic are also set forth in the Table.

The C.I.E. colorimetric values are based upon the I.C.I. Chromaticity Diagram. C.I.E. refers to the first International Commission of Illumination and the diagram from which the values are taken defines color in terms of mixtures of theoretical colored lights. The C.I.E. system makes possible the exact specification of colors by means of a "color map." The C.I.E. system of color rotation specifies the color of glasses in terms of brightness, purity and dominant wave length. "Brightness," which is usually expressed in terms of percentage, is the amount of visual response to an observer to the radiation emergent from a transparent object relative to the response in this observer to the radiation incident upon the object. Thus, brightness may be briefly termed the brightness of color of an object. "Purity," which is also normally expressed in terms of percentage, is a measure of the monochromaticness of a color with monochromatic light having a purity of 100%.

By diluting the monochromatic radiation with white light made up of all wave lengths the color is thereby diluted and the purity is reduced. "Dominant Wave Length," usually expressed in millimicrons, is the wave length of monochromatic light appearing to the eye to have the same hue as the mixed light actually encountered. The C.I.E. data for the above examples was obtained from a Hardy General Electric Spectrophotometer, Cat. 5962004G40, Model No. 2000915.

When small amounts of sulfur are used as "co-colorants" in the present glasses, such as in Example 34, one effect is to reduce part of the transition metal oxide to a lower oxide, and much of the sulfur is actually lost or volatilized. It has been found that the following glass, melted in a gas atmosphere with about 0.1 weight percent graphite added (which of course burned out during melting) gave substantially similar color results as in Example 34.

|  | Weight percent |
|---|---|
| $SiO_2$ | 66.7 |
| $Al_2O_3$ | 20.9 |
| CaO | 4 |
| $Li_2O$ | 3.6 |
| $TiO_2$ | 1.5 |
| $ZrO_2$ | 1.7 |
| $V_2O_5$ | 0.06 |
| $P_2O_5$ | 0.6 |
| $Na_2O$ | 0.7 |
| $K_2O$ | 0.2 |
| (C) | 0.1 |

This glass was heat treated, as follows:

1275° F. for 64 hours
1550° F. for 1 hour

The glass was light olive green before heat treatment. After heat treatment, the resulting partially crystalline transparent ceramic was a very dark orange amber, and it had a lineal coefficient of thermal expansion (0–300° C.) of $6 \times 10^{-7}$. Thus it has been found that a glass of the invention as set forth herein containing vanadium oxide, melted under reducing conditions effective to reduce or maintain at least a portion of the vanadium oxide in a valence state lower than 5, gives a colored glass, and an unexpectedly different color on crystallization. While amounts of vanadium oxide less than 0.4 perecnt are usually used, it is sufficient for most purposes to employ less than .2 percent.

To better emphasize the unexpected difference between the colored glasses and the colored transparent glass-ceramics formed therefrom, reference is made to FIG. 2 which shows the transmission curves of the glasses and glass-ceramics of Examples 34 and 35 of Table VI.

While the temperature at which nucleation or nuclei formation occurs will vary with the particular crystallizable glass compositions, the period of time at which the glass is maintained at the nucleation temperature will have a bearing on light transmission of the subsequently crystallized transparent glass-ceramic. The particular finishing or crystallizing temperature to which the nucleated glass is subjected will also affect the light transmission characteristics of the final glass-ceramic. This feature is illustrated in FIG. 3 wherein four glasses of the composition of Example 6 were subjected to different nucleation times and finishing times as indicated in the drawing and the light transmission data for the resulting glass-ceramics were compared with the annealed glass. To further appreciate the significance of the curves of FIG. 3 reference is made to Table VII, wherein the C.I.E. data and the actual transmitted colors obtained are set forth for the glass and the glass-ceramics corresponding to Curve No. 1–5 at FIG. 3.

TABLE VII

| Curve number | (1) | (2) | (3) | (4) | (5) |
|---|---|---|---|---|---|
| C.I.E. data: | | | | | |
| Thickness, mm | 3.18 | 3.18 | 3.18 | 3.18 | 3.18. |
| Brightness | 24.8 | 6.7 | 8 | 4.2 | 0.5. |
| Dominant wave-length | 580.1 | 492.9 | 493.8 | 505.5 | 643. |
| Percent purity | 68 | 50.2 | 49 | 64.4 | 79.4. |
| Color | Amber (glass) | Cranberry red | Cranberry red | Purplish red | Dark red. |

As the term is used in the present disclosure, when reference is made to a "transparent" glass-ceramic, it is to be understood that the glass-ceramic, which contains as predominant crystalline species lithium-containing crystalline phases, either as beta-eucryptite or beta-eucryptite-like crystals, or as beta-spodumene or beta-spodumene-like crystals, or both, as indicated by X-ray diffraction data, has substantially all of its crystals of a diameter of less than ⅓ micron and preferably less than ¼ micron. Transparent glass-ceramics having excellent transparency characteristics for visible light have substantially all crystals of less than .1 micron diameter. The "diameter," as used herein, refers to the largest lineal dimension across a crystal.

The transparent colored low-expansion, crystallized glass-ceramics of the present invention have a large number of uses as cookware, carafes, and the like where contact with heated surfaces and cool surfaces is usually encountered. Such glass ceramics are suitable for use in all instances where transparent glass having low expansion characteristics, but not as low as those of the present invention, has previously been used, particularly since the present colored glass-ceramics have excellent thermal shock properties and good transparency properties.

Another area wherein some of the transparent low expansion glass-ceramics of the present invention find a suitable use is as a heating surface disposed above an infra-red heating unit in a stove or range, thus replacing the coils presently used on many electric cooking ranges. The infra-red heat from a heating element such as a tungsten unit, passes readily through the glass-ceramic plate. If the glass-ceramic is colored red, the larger portion of the emitted visible light is absorbed or reflected back by the plate, with the possible exception of the red light waves which would be visible through the plate and warn the housewife that the heating unit is on. If a clear, colorless glass-ceramic is used, visible light is also transmitted, or known metal oxide or metal coatings which transmit infra-red radiation and reflect most of the visible light are employed to minimize light transmittance. Pans containing fluids or foods to be heated then need only be placed on such a glass-ceramic plate. Suitable transparent glass-ceramics for this use are those of Examples 9 and 16 of Table III which have a ruby color as well as Example 34, which also has a high transmittance of infra-red. Example 9 has been found to be more suitable since it contains less water, as shown by its transmittance curve and has a better infra-red transmittance curve than the latter, although both glass-ceramics have superior infra-red transmittance properties than the low-expansion glasses which have previously been used for this purpose. The transparent glass-ceramic of Example 34 is superior to either Example 9 or 16 in transmittance of infra-red radiation and also has high absorbance for visible light, transmitting, as will be seen, a portion of the visible light as indicated in FIG. 2.

The crystallizable glass compositions of the present invention, while excellent for producing colored transparent low expansion glass-ceramics are also excellent for producing colored and white opaque ceramics having low coefficients of thermal expansion (less than $20 \times 10^{-7}$ over the range 0–300° C.) and excellent thermal shock qualities. For example, white, opaque crystallized ceramic carafes were prepared having the composition of Example 40. The batch ingredients were melted together at a temperature of 2900° F. for about 72 hours, and blowing the molten glass to the desired shape of the carafes. The glass was annealed and then subjected to the following heat treatment.

| Rate, ° F./minute | Temperature | Time (hours) |
|---|---|---|
| 4 | 1,275 | 5 |
| 0.9 | 1,300 | 5 |
| 0.9 | 1,275 | 5 |
| 4 | 1,600 | 2 |
| 4 | 1,650 | 3 |

Thereafter, the ware was slowly cooled. The resulting opaque ceramic carafes had a coefficient of thermal expansion (0–300° C.) of $10 \times 10^{-7}$.

Another glass composition was melted, heat treated and formed into rods for measurements. This was the composition of Example 38 of Table VIII, infra. A portion of the rods was heated at 1300° F. for two hours and then at 1525° F. for two hours. The resulting transparent, colorless ceramic had a coefficient of expansion of $0.3 \times 10^{-7}$ over the range of zero to 300° C. and a modulus of rupture of 13,000 p.s.i. Its thermal shock resistance, plunging into cold water, was greater than 1500° F. Another portion of the rods was treated by heating at 1400° F. for two hours, 1450° F. for two hours and 1900° F. for one hour. The coefficient of expansion was about $10 \times 10^{-7}$ and the modulus of rupture was 18,600 p.s.i., and the ceramic was opaque.

In general, in order to make the new opaque ceramics of the present invention, the initial or nucleating heat treatment temperatures and times are as before described, while the finishing temperatures are in the range from about 1600 to about 2100 or 2200° F., with the time in this temperature range being from about ½ hour up to 5 or 6 hours, although longer times can be employed if desired.

The tested flexural strength of the crystallized material was determined using crystallized cane samples, usually of about 0.20 inch in diameter, and in all cases from 0.15 to 0.5 inch in diameter. The modulus of rupture tests were made using a Tinius-Olsen testing machine. This machine applies a measured load through a single knife edge to the center of a 4" long sample of cane supported on two knife edges (3-point loading). The load is applied at a constant rate of 24 pounds per minute until failure occurs, with a marker indicating the highest load applied to the point of failure. Before the cane samples are tested they are abraded uniformly by rotating in a slow-speed drill press in contact with 320-grit emery paper under hand pressure. This technique assures that the abrasions are parallel to the direction of loading. A dail micrometer calibrated in inches and equipped with a bar contact instead of a point contact is used to measure maximum and minimum diameters at the center of the samples to an accuracy of 0.0005 inch. Since few cane samples are perfectly round, the load is applied normal to the maximum diameter and the standard formula for an elliptical cross-section is used in calculating the modulus of rupture as follows:

$$MR = \frac{\text{Load (lbs.) x 8 x span (in.)}}{(D_1^2 \times D_2)\pi}$$

Each value reported in Table III is the average of a number of cane samples so tested.

In another aspect of this invention it has been discovered that a particular group of crystallizable glass compositions generally falling within the broad disclosure made above for the transparent glass-ceramics, after being nucleated for a sufficient period of time, may subsequently be treated at a finishing temperature (and it will be remembered that this temperature can be the same as the "nucleating" temperature, or even lower) which can vary over a wide range, usually of from about 50 to 100° F. or more, without substantially affecting the coefficient of thermal expansion of the finished product. This discovery is particularly important in making transparent glass-ceramic bodies of substantial thickness, such as a reflecting mirror for a telescope, where it is desirable that the coefficient of thermal expansion of the mirror be zero or as close to zero as possible.

In subjecting a thermally crystallizable glass body of the $SiO_2\text{-}Al_2O_3\text{-}Li_2O$ system after nucleation has been achieved, to a finishing temperature sufficient to complete the crystallization wherein the resulting glass-ceramic contains as predominant crystalline species lithium-containing crystalline phases, either as beta eucryptite crystals or beta eucryptite-like crystals, or as beta-spodumene or beta-spodumene-like crystals as shown by X-ray diffraction data, or both, the coefficient of thermal expansion of the final product will vary within the body unless extreme care is utilized and the temperature of the entire body is slowly and uniformly increased during the crystallization process. This slow process of uniformly heating the crystallizable glass may take days, weeks and even months, depending on the size of the body and its thickness. This is due to the fact that heat applied to the outer surface of a glass body, say a thickness of from ½ to 5 inches or more, passes into the inner portions of the body largely by conduction. Thus, unless the temperature is very gradually increased, the outer surface of the body will be at a substantially higher temperature than the inner areas of the body. Conversely, the process is reversed on cooling after heat treatment, so that the inner portions remain longer at conversion temperatures.

In the process of thermally crystallizing a glass body, the thermal expansion characteristic of the crystallized product decreases rather abruptly as the body is subjected to a finishing or crystallizing temperature and a minimum coefficient of expansion is reached at a particular temperature above the nucleation temperature at a given time of heat treatment. As the crystallization temperature to which the nucleated body is subjected to increases (assuming a multiple temperature heat treatment), the thermal coefficient of expansion of the crystallized body also increases until a particular higher temperature is reached. Above this higher temperature, which will, of course, depend upon the composition of the thermally crystallizable body, there is little, if any, further increase in the coefficient of thermal expansion for the resulting crystallized body.

Ideally, the minimum coefficient of thermal expansion should be reached over as broad a finishing or crystallization temperature range as possible. Such a broad finishing range would enable one to heat treat rather intricate articles of varying thicknesses to a desired low thermal expansion with a minimum of within-article thermal expansion difference due to uneven heat treatment. This becomes especially significant and important when heat treating massive articles, such as reflecting mirror blanks for telescopes of substantial thickness above ½ to 5 inches or even of considerably greater thickness as used by observatories and amateur astronomers. For example, a telescope mirror blank may have a thickness of at least 1 inch and a diameter of greater than six times the thickness.

It has now been discovered that a crystallizable glass composition containing the following essential components, present in the glass composition in the following weight percent limits, can be treated at a finishing temperature over a broad range of from about 50 to 100° F., and even more, without affecting the substantially uniform, low expansion characteristics imparted to the transparent glass-ceramic which is formed, the glass-ceramic having a lineal coefficient of expansion of about $-10 \times 10^{-7}$ to about $10 \times 10^{-7}$ per °C. over the range zero to 300° C.

| Component: | Weight percent |
|---|---|
| $SiO_2$ | 56–68 |
| $Al_2O_3$ | 18–27 |
| $Li_2O$ | 3.4–4.5 |
| $CaO$ | 0–3 |
| $ZnO$ | 0–2 |
| $B_2O_3$ | 0–4 |
| $TiO_2$ | 0–6 |
| $ZrO_2$ | 0–3 |
| $MgO$ | 0–3 |
| $Na_2O$ | 0–1 |
| $P_2O_5$ | 0–3 |
| $(SiO_2+Al_2O_3)$ | At least 82 |
| $(SiO_2+Al_2O_3+B_2O_3+P_2O_5)$ | 86–91 |
| $(CaO+MgO+ZnO+Na_2O)$ | 2.5–6 |
| $(SiO_2+Al_2O_3+P_2O_5+Li_2O)$ | No more than 93 |
| $TiO_2+ZrO_2$ | 2–6 | where the ratio of $(CaO+MgO+ZnO+Na_2O+B_2O_3)$ to $Li_2O$ is less than 2.4 and the ratio of $SiO_2$ to $Al_2O_3$ is no more than 3.8 and, as disclosed in the aforesaid parent application Ser. No. 386,693, is usually no more than 3.3. Except for Example 38, Examples 36–49 of Table VIII and the Examples of Tables VIII–A and VIII–B illustrate this aspect of the invention.

While the usual range of $SiO_2$ is 56–68 percent, as set forth herein and in the parent case, we have found that this $SiO_2$ range can be extended to 56–70 weight percent in the compositions set forth in the last paragraph. Example L in Table VIII–A is an excellent glass with the desired flat heat treatment characteristics, as will be seen by reference to Table VIII–B. However, the range of $SiO_2$ from 56–68 is still often preferred since many glasses having over 68 percent $SiO_2$ and the other characteristics of the presently claimed compositions, such as glass L, have relatively poor working properties such as high temperatures at the working point.

The following more narrowly defined ranges of in situ crystallized transparent low expansion ceramics of the invention have been found to be particularly useful, each range exhibiting the low expansion characteristics in a flat portion of the curve. One such range coming within the previous broader range are the glasses and ceramics consisting essentially of the following components present in the glass composition in the following weight percentage limits, based on the total glass composition:

| | |
|---|---|
| $SiO_2$ | 63–65 |
| $Al_2O_3$ | 20–22 |
| $Li_2O$ | 3.8–4 |
| $CaO$ | 2.5–3 |
| $ZnO$ | 1–1.5 |
| $B_2O_3$ | 3–4 |
| $TiO_2$ | 3.5–4 |
| $(SiO_2+Al_2O_3)$ | 84–86 |
| $(SiO_2+Al_2O_3+B_2O_3)$ | 88–89 |
| $(CaO+ZnO)$ | 3.5–4.5 |

A representative glass and transparent ceramic within this range is set forth in Example 36.

Another preferred range of such glasses and ceramics consists essentially of the following components present in the glass composition in the following weight percentage limits, based on the total glass composition:

| | |
|---|---|
| $SiO_2$ | 58–60 |
| $Al_2O_3$ | 24–26 |
| $Li_2O$ | 4.3–4.5 |
| $CaO$ | 2.5–3 |
| $ZnO$ | 1–1.5 |
| $B_2O_3$ | 3–4 |
| $TiO_2$ | 4.5–5 |
| $(SiO_2+Al_2O_3)$ | 83–85 |
| $(SiO_2+Al_2O_3+B_2O_3)$ | 86–88 |
| $(CaO+ZnO)$ | 3.5–4 |

A representative glass and transparent ceramic within this range is set forth in Example 37.

Another preferred range of such glasses and ceramics consists essentially of the following components present in the glass composition in the following weight percentage limits, based on the total glass composition:

| | |
|---|---|
| $SiO_2$ | 60–61 |
| $Al_2O_3$ | 24–26 |
| $Li_2O$ | 3.8–4 |
| $CaO$ | 2.5–3 |
| $ZnO$ | 1–1.5 |
| $B_2O_3$ | 3.2–3.6 |
| $TiO_2$ | 1.5–2 |
| $ZrO_2$ | 1.5–2 |
| $(SiO_2+Al_2O_3)$ | 84–86 |
| $(SiO_2+Al_2O_3+B_2O_3)$ | 88–89 |
| $(CaO+ZnO)$ | 3.5–4.5 |

A representative glass and transparent ceramic within this range is set forth in Example 39.

Another preferred range of such glasses and ceramic consists essentially of the following components present in the glass composition in the following weight percentage limits, based on the total glass composition:

| | |
|---|---|
| $SiO_2$ | 62–64 |
| $Al_2O_3$ | 20–22 |
| $Li_2O$ | 3.8–4 |
| $CaO$ | 2.5–3 |
| $ZnO$ | 1–1.5 |
| $B_2O_3$ | 3–4 |
| $TiO_2$ | 1.5–2 |
| $ZrO_2$ | 1.8–2.2 |
| $Na_2O$ | Up to 1 |
| $(SiO_2+Al_2O_3)$ | 83–85 |
| $(SiO_2+Al_2O_3+B_2O_3)$ | 87–88 |
| $(CaO+ZnO)$ | 4.3–5 |

Representative glass and transparent ceramics within this range are set forth in Examples 40 and 41.

Another preferred range of such glasses and ceramics consists essentially of the following components present in the glass composition in the following weight percentage limits, based on the total glass composition:

| | |
|---|---|
| $SiO_2$ | 66–68 |
| $Al_2O_3$ | 20–22 |
| $Li_2O$ | 3.8–4 |
| $CaO$ | 2.5–3 |
| $ZnO$ | 1–1.5 |
| $TiO_2$ | 1.5–2 |
| $ZrO_2$ | 1.2–2.2 |
| $Na_2O$ | Up to 1 |
| $(SiO_2+Al_2O_3)$ | 87–88 |
| $(CaO+ZnO+Na_2O)$ | 4–5 |

A representative glass and transparent ceramic within this range is set forth in Example 42.

Another preferred range of such glasses and ceramics consists essentially of the following components present in the glass composition in the following weight percentage limits, based on the total glass composition:

| | |
|---|---|
| $SiO_2$ | 63–65 |
| $Al_2O_3$ | 20–22 |
| $Li_2O$ | 3.6–3.8 |
| $CaO$ | 2.5–3 |
| $ZnO$ | 1–1.5 |
| $B_2O_3$ | 2.7–3.2 |
| $TiO_2$ | 1.5–2 |
| $ZrO_2$ | 1.8–2.2 |
| $Na_2O$ | Up to 1 |
| $(SiO_2+Al_2O_3)$ | 84–86 |
| $(SiO_2+Al_2O_3+B_2O_3)$ | 87–89 |
| $(CaO+ZnO+Na_2O)$ | 4–5 |

Representative of the glass and transparent ceramic within this range is that set forth in Example 43.

Another preferred range of such glasses and ceramics consists essentially of the following components present in the glass composition in the following weight percentage limits, based on the total glass composition:

| | |
|---|---|
| $SiO_2$ | 63–65 |
| $Al_2O_3$ | 20–22 |
| $Li_2O$ | 3.8–4 |
| $CaO$ | 2.5–3 |
| $ZnO$ | 1–1.5 |
| $Br_2O_3$ | 3.2–3.7 |
| $TiO_2$ | 1.5–2 |
| $ZrO_2$ | 1.5–2 |
| $Na_2O$ | Up to 1 |
| $(SiO_2+Al_2O_3)$ | 84–85 |
| $(SiO_2+Al_2O_3+B_2O_3)$ | 88–89 |
| $(CaO+ZnO+Na_2O)$ | 4–5 |

A representative glass and transparent ceramic within this range is set forth in Example 44.

Another preferred range of such glasses and ceramics consists essentially of the following components present in the glass composition in the following weight percentage limits, based on the total glass composition:

| | |
|---|---|
| $SiO_2$ | 64–66 |
| $Al_2O_3$ | 20–22 |
| $Li_2O$ | 3.8–4 |
| $CaO$ | 2.5–3 |
| $ZnO$ | 1–1.5 |
| $B_2O_3$ | 3–4 |
| $ZrO_2$ | 1.8–2.2 |
| $Na_2O$ | Up to 1 |
| $Cr_2O_3$ | Up to .3 |
| $(SiO_2+Al_2O_3)$ | 85–87 |
| $(SiO_2+Al_2O_3+B_2O_3)$ | 89–90 |
| $(CaO+ZnO+Na_2O)$ | 4–5 |

A representative glass and transparent ceramic within this range is set forth in Example 45.

Another preferred range of such glasses and ceramics consists essentially of the following components present in the glass composition in the following weight percentage limits, based on the total glass composition:

| | |
|---|---|
| $SiO_2$ | 63–65 |
| $Al_2O_3$ | 19–20 |
| $Li_2O$ | 3.8–4 |
| $CaO$ | 2.5–3 |
| $ZnO$ | 1–1.5 |
| $B_2O_3$ | 3.2–3.7 |
| $TiO_2$ | 1.5–2 |
| $ZrO_2$ | 1.8–2.2 |
| $Na_2O$ | Up to 1 |
| $(SiO_2+Al_2O_3)$ | 83–84 |
| $(SiO_2+Al_2O_3+B_2O_3)$ | 87–89 |
| $(CaO+ZnO+Na_2O)$ | 4–5 |

A representative glass and transparent ceramic within this range is set forth in Example 46.

Another preferred range of such glasses and ceramics consists essentially of the following components present in the glass composition in the following weight percentage limits, based on the total glass composition:

| | |
|---|---|
| $SiO_2$ | 63–65 |
| $Al_2O_3$ | 20–22 |
| $Li_2O$ | 3.8–4 |
| $CaO+MgO$ | 2.5–3 |
| $B_2O_3$ | 3.2–3.7 |
| $TiO_2$ | 1.3–2 |
| $ZrO_2$ | 1–1.7 |
| $P_2O_5$ | 1.3–2 |
| $Na_2O$ | up to 1 |
| $(SiO_2+Al_2O_3)$ | 84–86 |
| $(SiO_2+Al_2O_3+B_2O_3+P_2O_5)$ | 89–91 |
| $(SaO+MgO+Na_2O)$ | 3–3.5 |

Representative glasses and transparent ceramics within this range are set forth in Examples 47 and 48.

Another preferred range of such glasses and ceramics consists essentially of the following components present in the glass composition in the following weight percentage limits, based on the total glass composition:

| | |
|---|---|
| $SiO_2$ | 63–65 |
| $Al_2O_3$ | 20–22 |
| $Li_2O$ | 4.3–4.5 |
| $CaO$ | 2.5–3 |
| $ZnO$ | 1–1.5 |
| $B_2O_3$ | 3.2–3.7 |
| $TiO_2$ | 1.5–2 |
| $ZrO_2$ | 1.8–2.2 |
| $Na_2O$ | up to 1 |
| $(SiO_2+Al_2O_3)$ | 83–85 |
| $(SiO_2+Al_2O_3+B_2O_3)$ | 87–88 |
| $(CaO+ZnO+Na_2O)$ | 4–5 |

A representative glass and transparent ceramic within this range is set forth in Example 49.

Crystallizable glass compositions of Examples 36–49, inclusive, of Table VIII were melted at glass melting temperatures, shaped, and then the shaped glasses were nucleated for four hours at a temperature corresponding to about $10^{11.5}$ poises viscosity for each composition. Each nucleated glass was then subjected for one hour in most instances to a finishing temperature within the range of 1400 to 1800° F. and the coefficient of thermal expansion measured for each transparent crystallized body which was formed.

Figure 4:
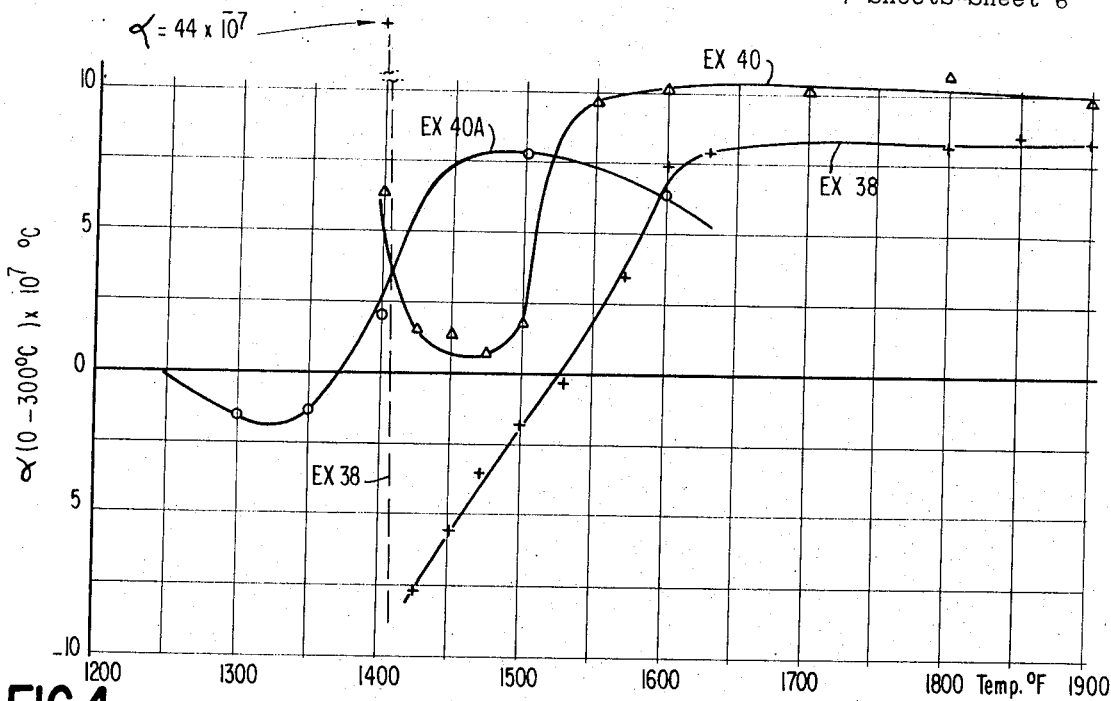
Figure 5:
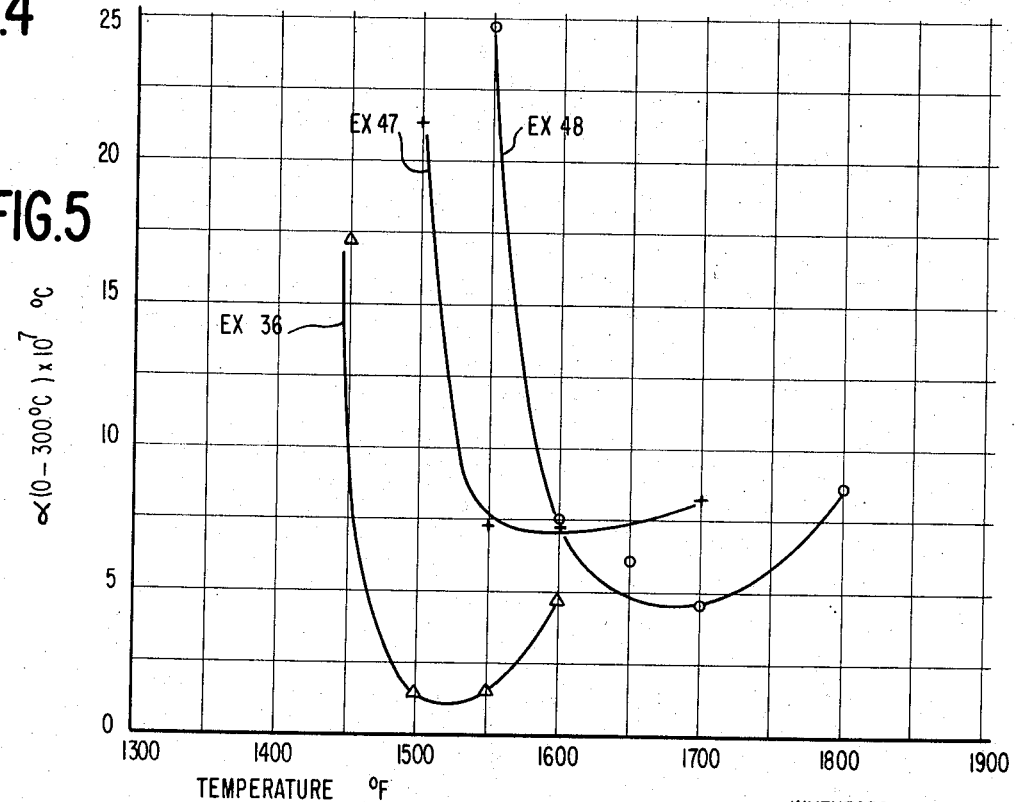
Figure 6:
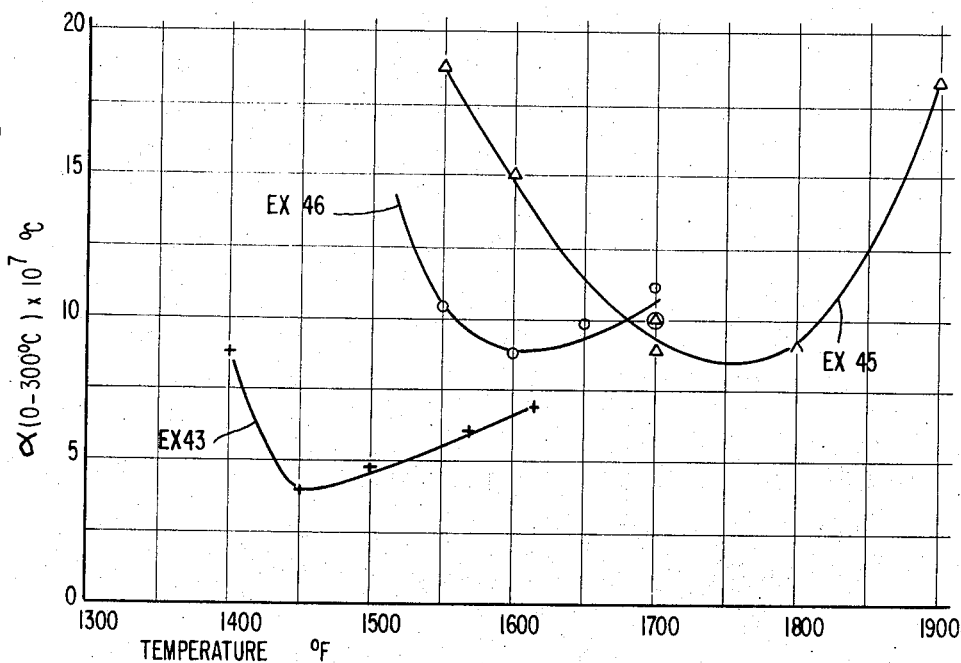
Figure 7:
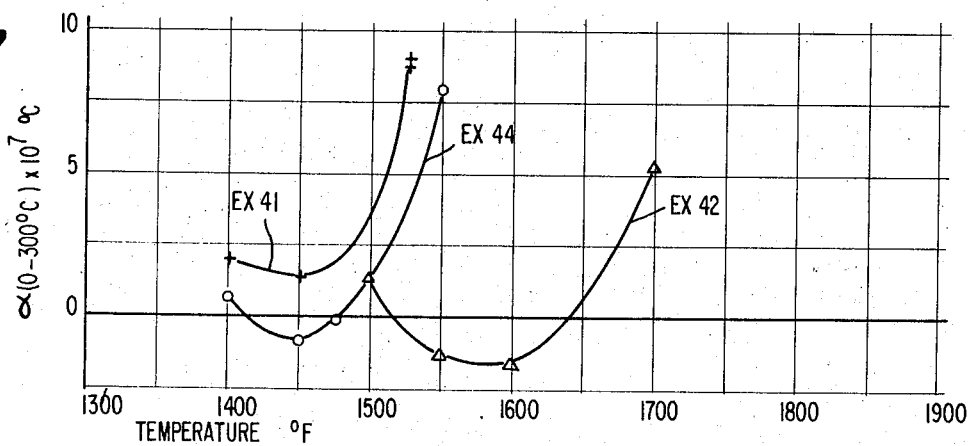
Figure 8:
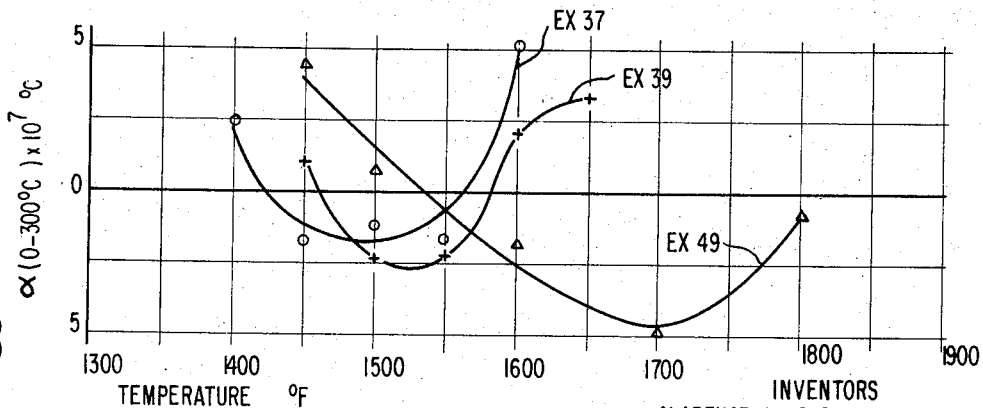

Thermal expansion versus heat treatment curves were obtained for each composition and several such curves are illustrated in FIG. 4 of the drawing.

In FIG. 4, the curves show the coefficients of expansion for the various finishing temperatures, at which temperatures the glasses being converted were held for one hour, except Example 38, which was held at the indicated temperatures for two hours. The preceding nucleation temperatures and times for the curves of Examples 38 and 40 were two hours and four hours respectively in the range from 1200 to 1300° F. For curve 40A the glass of Example 40 was first nucleated at a temperature of 1300° F. for 16 hours and finished at the indicated temperatures for 16 hours.

While all of the glass-ceramics of Examples 36–49 had good transparency characteristics, it must be noted that Example 38 is outside the composition range given above for these low-expansion glass-ceramics.

From FIG. 4 it will be noted that the composition of Example 40 has a substantially flat portion in the curve so that the coefficient of thermal expansion over the temperature range of 1400 to 1500° F. is $0\pm1 \times 10^{-7}$ per ° C. As may be seen from the curve of Example 38, FIG. 4, there is a rapid increase in coefficient characteristics corresponding directly to an increase in finishing temperature. Under the nucleation conditions before given, Example 38 does not exhibit a flat minimum expansion curve: thus at 1420° F. finishing temperature for 2 hours $\alpha$ was about $-8 \times 10^{-7}$ per ° C., while at a finishing temperature of 1400° F. for two hours $\alpha$ was about 44, still substantially all glass. The other examples of Table VIII (each having a one-hour finishing time) exhibited fairly flat curves corresponding in appearance to that of Example 40. See FIGS. 5 through 8:

TABLE VIII-A

| Ingredients | H | I | J | K | L | M |
|---|---|---|---|---|---|---|
| $SiO_2$ | 67.2 | 67.1 | 66.9 | 67.3 | 69 | 67.3 |
| $Al_2O_3$ | 20.7 | 20.6 | 20.6 | 20.4 | 19.2 | 20.7 |
| $Li_2O$ | 3.9 | 3.9 | 3.8 | 3.8 | 3.6 | 3.9 |
| CaO | 2.4 | 2.7 | 2.8 | 2.5 | 2.7 | 2.5 |
| ZnO | 1.3 | 1.6 | 1.1 | 1.2 | 0.9 | 1.6 |
| $TiO_2$ | 1.8 | 1.5 | 1.8 | 1.5 | 1.9 | 1.4 |
| $ZrO_2$ | 1.5 | 1.4 | 1.9 | 1.5 | 2.2 | 1.4 |
| $P_2O_5$ | | | | 1 | | |
| $Na_2O$ | 0.7 | 0.7 | 0.7 | 0.5 | 0.4 | 0.7 |
| $K_2O$ | 0.2 | 0.2 | | | | 0.2 |
| $Sb_2O_3$ | 0.3 | 0.3 | | 0.1 | | 0.3 |

TABLE VIII-B

| Glass No. | First heat treatment step | | Second heat treatment step | | Coefficient of expansion, $\alpha \times 10^7$ (0–300° C.) |
|---|---|---|---|---|---|
| | Temp., ° C. | Hrs. | Temp., ° C. | Hrs. | |
| H | 1,350 | 16 | 1,450 | 1 | −0.5 |
| | 1,350 | 16 | 1,550 | 1 | −2.2 |
| I | 1,350 | 16 | 1,525 | 1 | −3.1 |
| | 1,350 | 16 | 1,600 | 1 | −3.8 |
| J | 1,375 | 2 | 1,550 | 1 | −1.7 |
| | 1,375 | 2 | 1,600 | 1 | −0.6 |
| | 1,375 | 2 | 1,650 | 1 | −2.8 |
| K | 1,250 | 64 | 1,500 | 4 | −4.3 |
| | 1,300 | 16 | 1,600 | 4 | −3.4 |
| | 1,250 | 120 | 1,500 | 4 | −4.5 |
| | 1,375 | 960 | None | | −4.5 |
| | 1,375 | 486 | None | | −4.6 |
| | 1,375 | 264 | None | | −3.8 |
| L | 1,375 | 16 | 1,550 | 1 | −0.4 |
| | 1,375 | 16 | 1,600 | 1 | −0.4 |
| | 1,375 | 16 | 1,650 | 1 | −0.7 |
| | 1,375 | 1,000 | None | | −0.5 |
| | 1,425 | 1,000 | None | | 0.2 |
| M | 1,300 | 64 | 1,600 | 1 | −1.5 |
| | 1,300 | 64 | 1,500 | 1 | −2.9 |

Table VIII-A shows further examples of glasses of this aspect of the invention that were variously heat treated as set forth in Table VIII-B to give transparent crystalline products having the coefficients of thermal expansion set forth therein. Use of these compositions permits a difference in temperature to exist between various portions of a thermally crystallizing body of substantial thickness of such compositions without any detrimental effect on the substantial uniformity of the low coefficient of thermal expansion throughout the body.

While very long-time, relatively low-temperature heat treatments can also result in a quite uniform coefficient of expansion throughout a thick body, even in a glass like Example 38, which did not show a flat portion in its curve (FIG. 4), it will be understood that such long heating times are very costly and can be justified only for items that can be sold at relatively high prices. Such heat treatments do give very small crystals and high transparency, and tend to yield a somewhat lower coefficient of thermal expansion. For instance, the glass of Example 43 (annealing point 1225° F.) gave the following results when individual samples were isothermally heated for the times and temperatures indicated:

| | $\alpha \times 10^7$ |
|---|---|
| 1325° F., 16 hours | 5.3 |
| 1325° F., 32 hours | 3.9 |
| 1325° F., 64 hours | 3.1 |
| 1325° F., 120 hours | 2.6 |
| 1325° F., 240 hours | 3.6 |
| 1225° F., 240 hours | 26 |
| 1225° F., 256 hours | 7.7 |
| 1225° F., 480 hours | 4.8 |

Other examples of long isothermal heat treatments are shown in Table VIII–B.

A transparent glass-ceramic of the composition of Example 41 was prepared by casting the glass as a cylindrical body having a diameter of 6 inches and a thickness of about 1½ inches. The thermally crystallizable glass body was subjected to the following heat treatment schedule: heated at rate of 5° F./min. to 1300° F. Held at 1300° F. for 6 hours. Heated at rate of 5° F./min. to 1450° F. Held at 1450° F. for 1 hour. Slowly cooled to room temperature.

The colored transparent glass-ceramic had a coefficient of thermal expansion of $1.4 \times 10^{-7}$ (0–300° C.). It was ground, polished and "figured," i.e., a proper parabolic curve was formed on the surface and a thin coating of aluminum was applied to the prepared surface in a conventional manner to form the reflecting surface.

Since a telescope is subjected to temperatures varying from 0–85° F., it is important that the reflecting mirrors have as low a coefficient of expansion as possible, preferably zero, so as not to distort the image. When a glass surface is subjected to heat, it expands, resulting in a mechanical reshaping of the surface. Since about all such mirrors today are made of fused silica, having a coefficient of thermal expansion of $5.5 \times 10^{-7}$ (0–300° C.), and such mirrors are enormously expensive because of the time necessary in properly making one, or are made of Pyrex glass, having an expansion coefficient of about $25 \times 10^{-7}$ for observatory telescopes and about $33 \times 10^{-7}$ for telescopes for amateur astronomers, the tremendous commercial advantage of the low expansion, low cost telescope mirror blanks of the present invention becomes obvious.

Such mirror blanks also have the added advantage of being relatively rapidly ground, polished and figured compared to the same steps with respect to fused silica or Pyrex glass mirror blanks which become heated during the preparatory operations and must be periodically permitted to cool before additional grinding, polishing or figuring is attempted. The presence of such heat during the preparation of a telescopic reflecting mirror from the mirror blank of the present invention would be almost immaterial and the mirror can be more readily and easily prepared from the blank than existing prior art mirrors.

It is important that the mirror be transparent so that when it is mounted in position within a telescope it can be optically inspected to make sure that it is free of physical stresses. Furthermore, even though the transparent glass-ceramic mirror contains a plurality of interlocked crystals, they are of a size small enough to permit grinding and polishing of the surface without the occurrence of "pitting" which results when large crystals are present and "torn off" from the surface by the aforementioned preparatory operations.

While the present compositions can be used to produce transparent glass-ceramic articles of substantial thickness in view of the flat curve characteristics which each composition displays at the low finishing or crystallization temperatures and over a wide temperature range, as illustrated in FIGS. 4–8, it has been discovered that the curves can be displaced downwardly and to the left on the graph, by varying the nucleation and crystallization conditions to which the glass article is subjected. For instance, in FIG. 4, Example 40, a flat curve of 0±.5 expansion over a finishing temperature range of 1400–1550° F. is shown. The composition of Example 40 had been nucleated at a temperature of 1300° F. for 4 hours. When the same glass composition is heated at 1300° F. for a period of 16 hours and then at the indicated finishing temperature for 16 hours, a lower coefficient of thermal expansion over a lower finishing temperature range is obtained, as illustrated in Example 40–A of FIG. 4.

Different nucleation times and temperatures for different compositions coming within the range set forth above produce a difference in the location of the flattened curve denoting a low expansion for the transparent crystallized ceramic over a substantially wide finishing temperature range and it is difficult to define these temperatures or times other than to say that they must be sufficient to produce a flattened curve over a finishing temperature range of from 50 to 100° F. or more wherein the coefficient of thermal expansion for each composition, as defined by the flattened curve, is from about $\pm 10 \times 10^{-7}$ per ° C. and preferably $\pm 3 \times 10^{-7}$.

Since large transparent glass-ceramic articles having a substantial thickness of, for example, five inches or more, must be subjected to a nuclei-forming treatment, i.e., nucleation, over a period of time sufficient to bring the temperature throughout the article to a substantially uniform nucleation point, the amount of nucleating agent has been limited as previously indicated. Larger amounts of nucleating agents can result in unwanted and undesirable crystallization taking place before a thick article has had time to cool to the optimum nucleating temperature range, and can result in crystals that are too large for transparency.

For uses of glasses and crystalline ceramics of the invention that require holding the formed glass objects for an extended time in temperature ranges where crystallization can take place, given long enough time, we have found that the amount of $TiO_2$ plus $ZrO_2$ should be limited to a maximum of about 3 weight percent and that the $TiO_2$ should be limited to about 1.5 percent of the glass compositions set forth herein. Usually the range of $TiO_2$ is from 1 to 1.5 percent in this aspect of the invention. One such use requiring such low nucleant levels is, for instance, in making very large objects, such as thick telescope mirror blanks which require a very long annealing time during which the glass must not prematurely crystallize.

The crystallizable glass compositions of this aspect of the invention, and as exemplified in Tables VIII and VIII–A, may, of course, be subjected to a heat treatment sufficient to form opaque white or colored ceramics. The various heat treatments of representative glasses which have been crystallized to opaque ceramics are set forth below in Table IX, with the base glass compositions of the examples in Table IX corresponding to those set forth in Table VIII.

TABLE IX

| Opaque-ceramic | Ex. 37 | Ex. 38 | Ex. 39 | Ex. 40 | Ex. 41 | Ex. 44 |
|---|---|---|---|---|---|---|
| Heat treatment, ° F. (hrs.) | 1,350 (1) 1,800 (2½) | 1,250 (2) 1,450 (2) 1,900 (1) | 1,250 (2) 1,400 (2) 1,800 (1) | 1,200 (2) 1,400 (2) 1,800 (1) | 1,300 (2) 1,500 (1) 1,800 (1) | 1,300 (2) 1,650 (2) 1,900 (1) |
| Color of opaque ceramic | White | White | White | White | Blue | White |
| $\alpha(0-300°\ C.) \times 10^7$ | 10.1 | | 12 | | | |
| Modulus of rupture | | 18,600 | 20,000 | | | |

In this specification the terms beta-eucryptite crystals and beta-eucryptite-like crystals have been used in an alternative sense. Thus, while beta-eucryptite is often thought of as the species crystal having one mole of lithium, one mole of aluminum and 2 moles of silicon, both terms are used in this application to designate crystalline species having the beta-eucryptite structure, as shown by X-ray diffraction, but the peaks can be shifted slightly depending upon whether there is a definite amount of silica present other than exactly 2 moles, either more or less silica than the 2 moles. Similarly, the terms beta-spodumene crystals and beta-spodumene-like crystals are used alternatively and in a generic sense, specifying crystalline species that have the crystalline structure of beta-spodumene that contains 4 moles of silica to one of alumina and one of lithia, but with the peaks shifted somewhat when the crystalline structure contains more or less than 4 moles of silica. In the claims, therefore, the terms beta-eucryptite and beta-spodumene are each used in this generic sense.

We claim:

1. A colored transparent low-expansion crystallized glass-ceramic formed by thermal in situ crystallization of a colored thermally crystallizable base glass capable of thermal in situ crystallization to yield as predominant crystalline species lithium containing crystals selected from the group consisting of beta-eucryptite and beta-spodumene, said ceramic containing a multitude of such crystalline species in random orientation throughout said ceramic and dispersed in a glassy matrix remaining as a result of said in situ crystallization, substantially all of the crystals of said ceramic being of a diameter less than ⅓ micron measured across the largest lineal dimension of the crystals, said transparent crystallized glass-ceramic having a coefficient of lineal thermal expansion of less than $12 \times 10^{-7}$ per °C. (0–300° C.), said transparent crystallized ceramic having a color which is different than the color of said glass from which it was formed.

2. A colored transparent low-expansion crystallized glass-ceramic formed by thermal in situ crystallization of a colored thermally crystallizable base glass containing at least the following components in the indicated weight percent limits, based on the total glass composition:

| Component: | Weight percent |
|---|---|
| $SiO_2$ | 50–75 |
| $Al_2O_3$ | 16–35 |
| $Li_2O$ | 3–5.5 |
| Nucleating agent | Variable |
| $Li_2O$+nucleating agent | At least 5.5 |
| Colorant | 0.005–2 | said base glass being capable of thermal in situ crystallization to yield as predominant crystalline species lithium-containing crystals selected from the group consisting of beta-eucryptite and beta-spodumene, said ceramic containing a multitude of such crystalline species in random orientation throughout said ceramic and dispersed in a glassy matrix remaining as a result of said in situ crystallization, substantially all of the crystals of said ceramic being of a diameter less than ⅓ micron measured across the largest lineal dimension of the crystals, said transparent crystallized glass-ceramic having a coefficient of lineal thermal expansion of less than $12 \times 10^{-7}$ per °C. (0–300° C.), said transparent crystallized ceramic having a color which is different than the color of said base glass from which it was formed.

3. A colored transparent low-expansion crystallized glass-ceramic formed by thermal in situ crystallization of a colored thermally crystallizable base glass consisting essentially of the following components in the indicated weight percent limits, based on the total composition:

| Component: | Weight percent |
|---|---|
| $SiO_2$ | 50–75 |
| $Al_2O_3$ | 16–35 |
| $Li_2O$ | 3–5.5 |
| $B_2O_3$ | 0–9 |
| $ZnO_2$ | 0–5 |
| $TiO_2$ | 0–10 |
| $SnO_2$ | 0–5 |
| $P_2O_5$ | 0–3 |
| $F_2$ | 0–0.2 |
| Alkaline earth oxides | 0–4.5 |
| ZnO | 0–4 |
| $Na_2O$ | 0–2 |
| Colorant | 0.005–2 |
| $(ZrO_2+TiO_2+SnO_2)$ | not over 10 |
| $(SiO_2+Al_2O_3)$ | 75–92 | the total of $TiO_2$, $ZrO_2$ and $SnO_2$ being from 2–10 percent, where the glass and resulting ceramic contains 94–100 percent of the foregoing components, the other 6 to zero percent being other compatible inorganic components, said transparent crystallized glass-ceramic containing as prodeminant crystalline species lithium-containing crystalline phases selected from the group consisting of beta-eucryptite and beta-spodumene, substantially all of the crystals of said ceramic being of a diameter less than ⅓ micron measured across the largest lineal dimension of the crystals, said transparent crystallized glass-ceramic having a coefficient of thermal linear expansion of less than $12 \times 10^{-7}$ per °C. (0–300° C.), said transparent crystallized ceramic having a color which is different than the color of said base glass from which it was formed.

4. A colored transparent crystallized glass-ceramic as defined in claim 3 wherein said colorant oxide is selected from the group consisting of NiO, and a mixture of NiO with an oxide selected from the group consisting of $Fe_2O_3$, MnO, CoO.

5. A colored transparent crystallized glass-ceramic as defined in claim 4 wheein said colorant oxide is NiO and is present in an amount sufficient to impart a ruby color to said glass-ceramic, said colored crystallizable base glass from which said glass-ceramic was crystallized having an amber color.

6. A colored transparent crystallized glass-ceramic as defined in claim 4 wherein said colorant oxide is NiO and is present in an amount sufficient to impart a salmon pink color to said glass-ceramic, said colored crystallizable base glass from which said glass-ceramic was crystallized having a yellow color.

7. A colored transparent crystallized glass-ceramic as defined in claim 4 wherein said colorant oxide is NiO and is present in an amount sufficient to impart a coral color to said glass-ceramic, said colored crystallizable base glass from which said glass-ceramic was crystallized having a yellow color.

8. A colored transparent crystallized glass-ceramic as defined in claim 4 wherein said colorant oxide is a mixture of NiO and $Fe_2O_3$, said oxide present in an amount sufficient to impart a salmon pink color to said glass-ceramic, said colored crystallizable base glass from which said glass-ceramic was crystallized having a yellow color.

9. A colored transparent crystallized glass-ceramic as defined in claim 4 wherein said colorant oxide is a mixture of NiO and MnO, said oxide present in an amount sufficient to impart a salmon pink color to said glass-ceramic, said colored crystallizable base glass from which said glass-ceramic was crystallized having a yellow color.

10. A colored transparent crystallized glass-ceramic as defined in claim 3 wherein said colorant oxide is selected from the group consisting of CoO and a mixture of CoO with an oxide selected from the group consisting of $Cr_2O_3$, $Fe_2O_3$, MnO, CuO and $S^=$.

11. A colored transparent crystallized glass-ceramic as defined in claim 10 wherein said colorant oxide is CoO and is present in an amount sufficient to impart a lavender color to said glass-ceramic, said colored crystallizable base glass from which said glass-ceramic was crystallized having a blue color.

12. A colored transparent crystallized glass-ceramic as defined in claim 10 wherein said colorant oxide is CoO and is present in an amount sufficient to impart a pink color to said glass-ceramic, said colored crystallizable base glass from which said glass-ceramic was crystallized having a blue color.

13. A colored transparent crystallized glass-ceramic as defined in claim 10 wherein said colorant oxide is a mixture of CoO and $Cr_2O_3$ and said oxides are present in an amount sufficient to impart a yellow color to said glass-ceramic, said colored crystallizable base glass from which said glass-ceramic was crystallized having a blue color.

14. A colored transparent crystallized glass-ceramic as defined in claim 10 wherein said colorant oxide is a mixture of CoO and $Fe_2O_3$ and said oxides are present in an amount sufficient to impart a pink color to said glass-ceramic, said colored crystallizable base glass from which said glass-ceramic was crystallized having a yellow color.

15. A colored transparent crystallized glass-ceramic as defined in claim 10 wherein said colorant oxide is a mixture of CoO and MnO and said oxides are present in an amount sufficient to impart a pink color to said glass-ceramic, said colored crystallizable base glass from which said glass-ceramic was crystallized having a blue color.

16. A colored transparent crystallized glass-ceramic as defined in claim 10 wherein said colorant oxide is a mixture of CoO and CuO and said oxides are present in an amount sufficient to impart a pink color to said glass-ceramic, said colored crystallizable base glass from which said glass-ceramic was crystallized having a blue-green color.

17. A colored transparent crystallized glass-ceramic as defined in claim 10 wherein said colorant oxide is a mixture of CoO and $S^=$ and said oxides are present in an amount sufficient to impart a blue purple color to said glass-ceramic, said colored crystallizable base glass from which said glass-ceramic was crystallized having a light grey color.

18. A colored transparent crystallized glass-ceramic as defined in claim 3 wherein the colorant is $S^=$ and is present in an amount sufficient to impart a blue color to the glass-ceramic, said colored crystallizable base glass from which said glass-ceramic was crystallized having a light gray color.

19. The colored transparent crystallized glass-ceramic as defined in claim 18 wherein said $S^=$ colorant is derived from ZnS present in said base glass composition.

20. A colored transparent crystallized glass-ceramic as defined in claim 3 wherein the colorant is a mixture of $S^=$ and $V_2O_5$, said colorant ingredients being present in an amount sufficient to impart a dark orange amber color to said glass-ceramic, said colored crystallizable base glass from which said glass-ceramic was crystallized having an olive green color.

21. A colored transparent crystallized glass-ceramic as defined in claim 3 wherein said colorant oxide is $Fe_2O_3$ and is present in an amount sufficient to impart a yellow color to said glass-ceramic, said colored crystallizable base glass from which said glass-ceramic was crystallized having a flint color.

22. A colored transparent crystallized glass-ceramic as defined in claim 3 wherein said colorant oxide is MnO and is present in an amount sufficient to impart a yellow color to said glass-ceramic, said colored crystallizable base glass from which said glass-ceramic was crystallized having a flint color.

23. A colored transparent crystallized glass-ceramic as defined in claim 3 wherein said colorant oxide is a mixture of NiO and CoO and said oxides are present in an amount sufficient to impart a red color ranging from cranberry to ruby to said glass-ceramic, said colored crystallizable base glass from which said glass-ceramic was crystallized having an amber color.

24. A colored transparent low-expansion crystallized glass-ceramic as defined in claim 3 wherein the ratio of $SiO_2$ to $Al_2O_3$ is no more than 3.3 parts by weight $SiO_2$ to 1 part $Al_2O_3$ and the colorant oxide is NiO, said NiO being present in an amount sufficient to impart a red color to said transparent glass-ceramic, said colored crystallizable base glass from which said glass-ceramic was crystallized having an amber color.

25. A colored transparent low-expansion crystallized glass-ceramic as defined in claim 3 wherein said crystallizable base glass composition is free from $TiO_2$ and said colorant oxide is $Cr_2O_3$ which is present in an amount up to 0.2 percent by weight of said glass, said $Cr_2O_3$ imparting a pink color to said transparent glass-ceramic, said crystallizable base glass from which said glass-ceramic is crystallized having a green color.

26. A ceramic of claim 1 wherein the colorants are selected from the group consisting of oxides of V, Cr, Mn, Fe, Co, Ni, Cu and divalently combined sulfur, present as a metal sulfide.

27. A colored transparent low-expansion crystallized glass-ceramic as defined in claim 3 wherein said colorant oxide is vanadium oxide, a sufficient amount of said vanadium oxide having vanadium with a valence less than 5 to impart a dark orange color to said transparent glass-ceramic, said crystallizable base glass from which said glass-ceramic is crystallized having an olive green color.

References Cited

UNITED STATES PATENTS

| | | | |
|---|---|---|---|
| 1,532,002 | 3/1925 | Thomson | 350—310 |
| 3,006,775 | 10/1961 | Chen | 106—39 DV |
| 3,117,881 | 1/1964 | Henry et al. | 106—39 DV |
| 3,121,605 | 2/1964 | Nunn | 346—107 |
| 3,157,522 | 11/1964 | Stookey | 106—52 |
| 3,241,985 | 3/1966 | Kuwayama | 106—39 DV |
| 3,252,811 | 5/1966 | Beall | 106—39 DV |
| 3,275,492 | 9/1966 | Herbert | 106—52 |
| 3,282,711 | 11/1966 | Lin | 106—39 DV |
| 3,282,712 | 11/1966 | Tashiro et al. | 106—39 DV |
| 3,380,848 | 4/1968 | Smith | 106—39 DV |

FOREIGN PATENTS

| | | | |
|---|---|---|---|
| 1,300,614 | 6/1962 | France | 106—39 DV |
| 38/3,271 | 4/1963 | Japan | 106—39 DV |
| 1,149,840 | 6/1963 | Germany | 106—39 DV |
| 3,715,319 | 1962 | Japan | 106—39 DV |
| 874,936 | 8/1961 | Great Britain | 106—39 DV |
| 1,070,124 | 5/1967 | Great Britain | 106—39 DV |
| 6605388 | 10/1967 | Netherlands | 106—39 DV |
| 3,718,061 | 1962 | Japan | 106—39 DV |
| 3,718,062 | 1962 | Japan | 106—39 DV |
| 3,718,063 | 1962 | Japan | 106—39 DV |

OTHER REFERENCES

Humnel: "Thermal Expansion Properties of Some Synthetic Lithia Minerals," vol. 34, No. 8, p. 238, Journal Amer. Cer. Soc. 1951, TP785.A62.

Doklady Akad. Nauk, USSR (1955), pp. 105–106, vol. 103.

Weyl: "Coloured Glasses," pub. 1959, London p. 204.

Moore et al.: "The Colours of Nickel in Glasses of Various Types and Their Implementation Concerning Glass (Other references on following page)

Structure." J. Soc. Glass Tech. 39, Abstract Parts I, II, III, pp. 215, 250, 287 and 302T–313T (1955).

Bancroft et al.: "Copper Oxide in the Borax Bead," J. Phys. Chem. 33, pp. 729–30 (1929).

Weyl and Marboe: "The Constitution of Glasses," pub. 1962, Interscience Publishers, pp. 294–6, 301–308, 484, 507–8, 511–515.

Berezhnoi, A. I.: "Glass Ceramics and Photo-Sitalls," Plenum Press, New York, 1970, pp. 262–265 and 426–7TP 862.B4C.2.

Vargin, U. V.: "The Glassy State, vol. 1, Catalyzed Crystallization of Glass," Izd. Akad. Nauk, USSR, Moscow-Leningrad (1963), pp. 107–112, found in Berezhnoi, p. 265.

ALLEN B. CURTIS, Primary Examiner

M. L. BELL, Assistant Examiner

U.S. Cl. X.R.

106—39.8; 65—33

UNITED STATES PATENT OFFICE
CERTIFICATE OF CORRECTION

Patent No. 3,788,865                    Dated January 29, 1974

Inventor(s) CLARENCE L. BABCOCK ET AL

It is certified that error appears in the above-identified patent and that said Letters Patent are hereby corrected as shown below:

In column 1 in the heading in line 7, after

"Ansonia, Oregon, Ohio  43616"

insert

-- assignors to Owens-Illinois, Inc., a corporation of Ohio --

Signed and sealed this 9th day of July 1974.

(SEAL)
Attest:

McCOY M. GIBSON, JR.          C. MARSHALL DANN
Attesting Officer             Commissioner of Patents

UNITED STATES PATENT OFFICE
CERTIFICATE OF CORRECTION

Patent No. 3,788,865      Dated Jan. 29, 1974

Inventor(s) Clarence L. Babcock et al.

It is certified that error appears in the above-identified patent and that said Letters Patent are hereby corrected as shown below:

1. In Col. 1 after the name and address of the inventors please insert ---, assignors to Owens-Illinois, Inc., Toledo, Ohio.

2. In the title of all seven (7) sheets of drawings, line 2, please delete the word "Focusing" and insert therefor ---Forming---

3. Table III, Ex. 3, (line Heat treatment °F. hrs., second occurrence) change "2,000(1)" to read ---1,600(1)---; Ex. 4, same line, change "1,300(2)" to read ---2,000(1)---; Ex. 5, same line, change "1,300(2)" to read ---1,350(2)---; Ex. 12, (line Heat treatment °F. hrs., second occurrence) change "1,300(2)" to read ---1,850(1)---; Ex. 19, entry opposite "$TiO_2$", change "1.9" to read ---1.8---; last line <u>before</u> Examples 21-25, change "x10$_7$" to read ---x10$^7$---.

4. Col. 19, line 9, change "1.2-2.2" to read ---1.8-2.2---; line 45, "$Br_2O_3$" should be ---$B_2O_3$---; Col. 20, line 33, "(SaO" should be ---(CaO---.

UNITED STATES PATENT OFFICE
CERTIFICATE OF CORRECTION

Patent No. 3,788,865     Dated Jan. 29, 1974

Inventor(s) Clarence L. Babcock et al.

It is certified that error appears in the above-identified patent and that said Letters Patent are hereby corrected as shown below:

5. Table VIII, Ex. 43, change "61.4" to read ---64.1---; Ex. 38, line 12 (opposite "$Na_2O$"), should read ---0.4---; Ex. 39, line 12 (opposite "$Na_2O$"), "0.4" should be deleted.

6. Claim 1, last line, "said glass" should read ---said base glass---.

7. Claim 3, fifth line, under the heading "Component", change "$ZnO_2$" to read ---$ZrO_2$---.

This certificate supersedes Certificate of Correction issued July 9, 1974.

Signed and sealed this 7th day of January 1975.

(SEAL)
Attest:

McCOY M. GIBSON JR.
Attesting Officer

C. MARSHALL DANN
Commissioner of Patents